United States Patent
DeCastro et al.

(10) Patent No.: US 11,665,477 B2
(45) Date of Patent: May 30, 2023

(54) LOCATION-ENABLED PORTABLE AUDIO SYSTEM

(71) Applicant: BUSHNELL INC., Overland Park, KS (US)

(72) Inventors: John DeCastro, Overland Park, KS (US); Scott O. Nyhart, Shawnee, KS (US); William Flood, Olathe, KS (US)

(73) Assignee: Bushnell Inc., Overland Park, KS (US)

( * ) Notice: Subject to any disclaimer, the term of this patent is extended or adjusted under 35 U.S.C. 154(b) by 0 days.

(21) Appl. No.: 16/935,929

(22) Filed: Jul. 22, 2020

(65) Prior Publication Data

US 2021/0144478 A1 May 13, 2021

Related U.S. Application Data

(63) Continuation-in-part of application No. 16/679,633, filed on Nov. 11, 2019, now Pat. No. 11,455,141.

(51) Int. Cl.
*H04R 5/04* (2006.01)
*H04R 5/033* (2006.01)
(Continued)

(52) U.S. Cl.
CPC ............... *H04R 5/04* (2013.01); *G06F 3/167* (2013.01); *H04R 1/1016* (2013.01);
(Continued)

(58) Field of Classification Search
CPC . A63B 69/3676; A63B 71/0622; A63B 69/36; A63B 71/0669; A63B 2071/068;
(Continued)

(56) References Cited

U.S. PATENT DOCUMENTS 5,996,116 A 12/1999 Tate
8,070,628 B2 12/2011 Denton et al.
(Continued)

FOREIGN PATENT DOCUMENTS

JP 2009232423 A 10/2009
KR 100959346 B1 * 5/2010
(Continued)

OTHER PUBLICATIONS

Kuassi, Ganmavo A., Non-Final Office Action issued for U.S. Appl. No. 16/679,633, filed Nov. 25, 2020, pp. 1-14, United States Patent and Trademark Office, Alexandria, Virginia USA.
(Continued)

*Primary Examiner* — Matthew A Eason
*Assistant Examiner* — Kuassi A Ganmavo
(74) *Attorney, Agent, or Firm* — Walter M. Egbert, III; Richard J. Brown; Reed Smith LLP

(57) ABSTRACT

Audio systems and methods for obtaining location information are disclosed. A portable, wireless speaker may include a beacon that a user may activate to remotely trigger a request for shot information, which may include location information of the user or speaker. The beacon may be wirelessly coupled to the speaker. Notably, the beacon may comprise an earpiece such as an earbud or pair of earbuds. The speaker may receive location information from a remote device, such as a GPS-enabled mobile phone. The shot information may be converted into an audio format for playback by the speaker. The speaker may pause the playback of the speaker to play out the shot information. The system may also comprise a visual display.

17 Claims, 15 Drawing Sheets

(51) Int. Cl.
  *H04R 1/10*    (2006.01)
  *G06F 3/16*    (2006.01)
  *H04W 4/029*   (2018.01)
  *A63B 69/36*   (2006.01)
  *A63B 71/06*   (2006.01)
  *A63B 57/00*   (2015.01)

(52) U.S. Cl.
  CPC ........... *H04R 1/1041* (2013.01); *H04R 5/033* (2013.01); *H04W 4/029* (2018.02); *A63B 57/00* (2013.01); *A63B 69/36* (2013.01); *A63B 69/3676* (2013.01); *A63B 71/0622* (2013.01); *A63B 71/0669* (2013.01); *A63B 2071/068* (2013.01); *H04R 2420/07* (2013.01)

(58) Field of Classification Search
  CPC ........ A63B 57/00; H04R 5/04; H04R 1/1016; H04R 1/1041; H04R 5/033; H04R 2420/07; H04W 4/024; G06F 3/167; H04M 3/2236; A63F 7/0626
  See application file for complete search history.

(56) References Cited

U.S. PATENT DOCUMENTS

| | | | |
|---|---|---|---|
| 8,070,692 B2 | 12/2011 | Balardeta et al. | |
| 8,355,869 B2 | 1/2013 | Balardeta et al. | |
| 8,460,111 B2 | 6/2013 | Hart | |
| 9,383,448 B2 | 7/2016 | Park | |
| 9,535,162 B2 | 1/2017 | Park | |
| 2002/0052750 A1 | 5/2002 | Hirooka | |
| 2003/0216228 A1 | 11/2003 | Rast | |
| 2006/0270450 A1 | 11/2006 | Garratt et al. | |
| 2008/0235026 A1 | 9/2008 | Garratt et al. | |
| 2009/0082139 A1 | 3/2009 | Hart | |
| 2009/0176540 A1* | 7/2009 | Do | H04M 1/6066 455/575.2 |
| 2009/0305819 A1 | 12/2009 | Denton et al. | |
| 2010/0225270 A1 | 9/2010 | Jacobs et al. | |
| 2011/0228925 A1* | 9/2011 | Birch | H04M 1/05 379/428.02 |
| 2012/0071277 A1* | 3/2012 | Denton | G01C 22/00 473/407 |
| 2013/0129134 A1* | 5/2013 | Parraga Gimeno | H04R 1/02 381/338 |
| 2013/0178311 A1 | 7/2013 | Peterson | |
| 2014/0114560 A1* | 4/2014 | Jensen | H04S 7/304 701/409 |
| 2014/0277627 A1* | 9/2014 | Bastawros | A63B 71/0669 700/91 |
| 2017/0021260 A1 | 1/2017 | Willett et al. | |
| 2017/0348580 A1* | 12/2017 | Dugan | A63B 69/3614 |
| 2018/0154236 A1* | 6/2018 | Ishikawa | A63B 69/3661 |
| 2018/0236333 A1* | 8/2018 | Loduca | G09B 19/0038 |
| 2018/0261010 A1* | 9/2018 | Kudirka | A63B 24/0021 |
| 2018/0345101 A1 | 12/2018 | Youn | |
| 2020/0221198 A1 | 7/2020 | Pupecki et al. | |

FOREIGN PATENT DOCUMENTS

| | | | |
|---|---|---|---|
| KR | 100970252 B1 * | 7/2010 | |
| KR | 20130101806 A * | 9/2013 | |
| KR | 20180028077 A1 * | 3/2018 | |
| KR | 101877285 B1 | 7/2018 | |

OTHER PUBLICATIONS

Extended European Search Report and Opinion for related European application No. 20206744.3, dated Sep. 8, 2021.

\* cited by examiner

LOCATION-ENABLED PORTABLE AUDIO SYSTEM

CROSS-REFERENCE TO RELATED APPLICATIONS

This application is a continuation-in-part of U.S. application Ser. No. 16/679,633, filed Nov. 11, 2019.

FIELD OF TECHNOLOGY

Aspects of the present disclosure relate to a system for audio playback, more specifically a system for controlling and generating audio playback including a remote positioning and location functionality.

BACKGROUND

In certain sporting activities, knowledge of a player's location and range to a target can provide the player with a distinct playing advantage. Golfers, for example, have relied on traditional range finding devices to determine the distance from the golfer's position to the green or flag stick. Knowing this distance allows the golfer to choose an appropriate club or determine the speed or strength required to hit the ball. Traditional ranging devices may include an optical device coupled to a laser transmitter and receiver, that when aimed and fired at a target, transmits a beam toward the target, receives a reflected beam to the receiver and calculates the distance from the device to the target based on the time-of-flight of the beam. These devices can be cumbersome, heavy and inaccurate given an obstructed field-of-view or other interference.

Golfers and other sports enthusiasts also may enjoy listening to music or other audio content while playing. Portable, wireless speakers known in the art allow a player to carry the speaker in a bag, golf cart or other vehicle. When using in a sport like golf, however, traditional portable speakers must be left in the golf bag or in the cart when the golfer steps away from the bag or cart to take a shot. The golfer no longer has immediate access to the controls on the speaker requiring the golfer to return to the bag or cart to pause, stop, or otherwise control it.

SUMMARY

Embodiments of the present invention include a portable audio system for control and playback of audio content, including certain information relating to a user's location, environment and other personalized content. According to one aspect, an audio playback system may include a beacon configured to trigger a request for shot information and a controller wirelessly coupled to the beacon. The controller may be configured to transmit the request for shot information to a remote device and receive the shot information from the remote device. The shot information may be converted into an audio signal and play back the audio signal to an audio output.

According to another aspect, a method of determining shot information may include receiving a request for shot information from a wireless beacon and transmitting the request to a remote device. Shot information may be received from the remote device and encoded as an audio file. The audio file may be transmitted to an audio output.

According to another aspect of the present disclosure, an audio system may comprise a beacon configured to trigger a request for shot location and a controller wirelessly coupled to the beacon. A non-transitory, computer-readable storage medium may be in operable communication with the controller, and contain one or more programming instructions that, when executed, cause the controller to receive a request for shot information triggered from the wireless beacon and transmit the request to a remote device. Shot information may be received from the remote device and be encoded as an audio file. The audio file may be transmitted to an audio output.

This disclosure provides an audio playback system including a beacon configured to trigger a request for shot information, wherein the beacon comprises an earpiece; a controller wirelessly coupled to the beacon, the controller configured to: transmit the request for shot information to a remote device; receive the shot information from the remote device; convert the shot information into an audio signal; and play back the audio signal to an audio output.

Embodiments of the audio system include any of the following alone or in combination.

The audio system wherein the earpiece includes an earbud or a pair of earbuds.

The audio system further including a microphone coupled to the controller, the microphone configured to receive a voice command.

The audio system wherein the beacon is configured to activate the microphone.

The audio system wherein the beacon further includes an actuator, the actuator configured to trigger the request for the shot information.

The audio system wherein the beacon includes a GPS-enabled location service.

The audio system wherein the beacon is coupled to the controller through a Bluetooth connection.

The audio system wherein the shot information includes a geographic location correlated with environmental information.

The audio system wherein the environmental information includes data relating to at least one landmark.

The audio system wherein the shot information includes a distance between the beacon and the at least one landmark.

The audio system wherein the shot information includes at least one of a distance, an environmental element, a geographic location element, a shot history, a commentary, and an applause element.

The audio system wherein the controller includes an application stored on a mobile device.

The audio system further including a speaker device coupled to the audio output.

The audio system wherein the controller determines the operational state of the earpiece and directs audio output to the earpiece or the speaker device depending on the operational state of the earpiece.

The audio system wherein the operational state of the earpiece is based at least in part on sensor information and user input.

The audio system wherein the user input includes a tap signal, voice command, or a combination thereof.

The audio system wherein the speaker device defines a recess, the recess sized and shaped to retain the earpiece.

The audio system wherein the speaker device further includes a charging interface configured to charge the beacon.

The audio system wherein the speaker device further includes a magnetic mount configured to mount the speaker device to a magnetic surface.

The audio system wherein the speaker device further includes a visual display.

This disclosure also provides a method of determining shot information including:
  receiving a request for shot information from a wireless beacon wherein the wireless beacon includes an earpiece;
  transmitting the request to a processor;
  receiving shot information from the processor;
  encoding the shot information as an audio file;
  transmitting the audio file to an audio output.

This disclosure also provides an audio system including:
  a beacon configured to trigger a request for shot location, wherein the beacon includes an earpiece;
  a controller wirelessly coupled to the beacon; and
  a non-transitory, computer-readable storage medium in operable communication with the controller, wherein the computer-readable storage medium contains one or more programming instructions that, when executed, cause the controller to:
    receive a request for shot information triggered from the wireless beacon;
    transmit the request to a processor;
    receive shot information from the processor;
    encode the shot information as an audio file; and
    transmit the audio file to an audio output.

This disclosure also provides an audio playback system including:
  a beacon configured to trigger a request for shot information;
  a speaker device including a speaker and a visual display;
  a controller wirelessly coupled to the beacon, the controller configured to:
    receive the request for shot information;
    transmit the request for shot information to a processor;
    receive the shot information from the remote device;
    convert the shot information into an audio signal; and
    play back the audio signal to an audio output.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The present disclosure provides audio systems and methods for obtaining a personalized information, including information relating to a user's location, environment and/or gameplay. According to one aspect, the present disclosure provides a portable, wireless speaker that includes a beacon that a user may activate remotely to trigger a request for shot information for the user. Shot information, as used herein, may include information such as, without limitation, a user's location, environmental elements, landmarks, distances, gameplay history, ambient or crowd noises, or the like. The beacon may be wirelessly coupled to a controller, such as an application installed and running on a mobile device. According to one aspect, the controller may receive shot information from a remote device, such as a GPS-enabled location service. The shot information may be converted into an audio format for playback by the speaker. The speaker may pause, attenuate or otherwise adapt the playback of audio on the speaker to play out the shot information.

Figure 1:
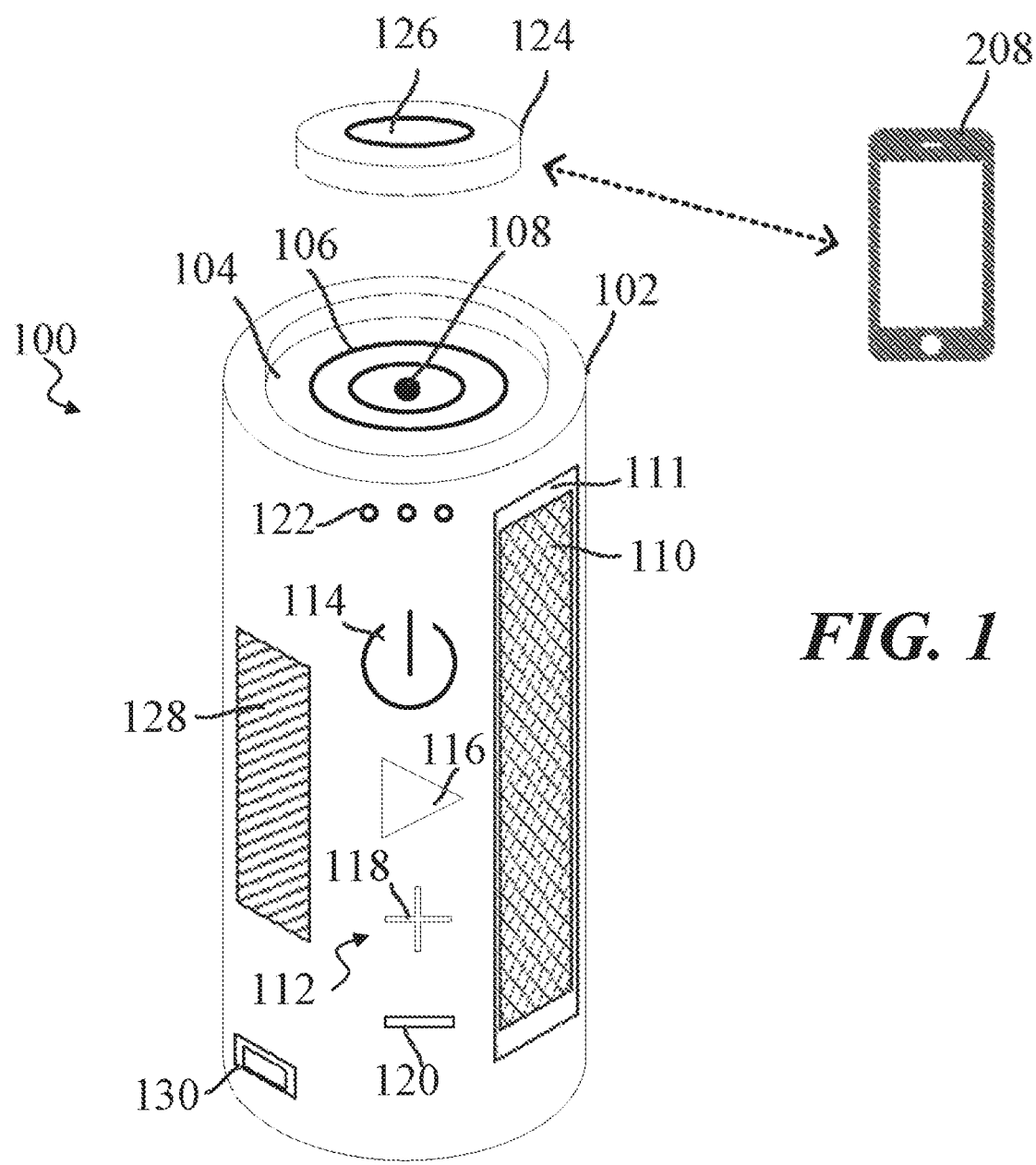
FIG. 1 depicts the components of an audio system according to an aspect of the present disclosure.

FIG. 1 depicts the components of an audio system 100 according to an aspect of the present disclosure. The audio system may include a speaker device 102 that forms or defines one or more voids 111. The audio system 100 may include one or more speakers 110 aligned with the voids 111 and configured to play back audio content stored in memory or streamed from a connected device, such as a mobile device 208. A fabric or other covering material may be disposed over the speakers 110 to prevent dust and other air-borne debris from entering the speaker 110 or speaker device 102. A power source (not shown) may provide energy to the audio system 100. The power source may be any power source commonly known in the art, including a rechargeable battery and/or an AC power connecter.

A control panel 112 may be configured to alter, adjust or otherwise control the audio playback. According to one aspect, the control panel 112 may include one or more buttons formed in or on the body, and coupled to a controller (not shown). The controller, as described herein may be software, hardware or a combination of both. According to one aspect, the controller may be a software application resident on a mobile device 208. Alternatively, the controller may reside in the speaker device 102. Control buttons may include a power button 114, a play/pause button 116, an up-volume button 118 and a down-volume button 120. The power button 114 may also function as a pairing button, establishing a paired connection with the mobile device 208 or another device. A microphone 122 may be coupled to the controller to receive voice activation commands or signals to control further the audio system. According to one aspect the speaker device 102 may include a magnetic mount 128 configured to mount the speaker device 102 securely to a metal or other magnetic material.

According to one aspect, the audio system 100 may include a beacon 124 that is coupled to the controller. The beacon 124 may be sized and shaped to fit into a recess 104 formed or defined in the speaker device 102. According to one aspect, the beacon 124 may be in the form of a poker chip-sized device suitable for carrying in the user's pocket. The speaker device 102 may include a beacon magnet 108, or magnetic material, to correspond to a magnet, or magnetic material, on the beacon 124. The beacon magnet 108 may be adapted to retain the beacon 124 in the recess 104 when the beacon 124 is not in use. According to one aspect, the speaker device 102 may further include a wireless charging interface 106 that, when the beacon 124 is placed in the recess 104, recharges a battery (not shown) in the beacon 124 using the audio system power source. The audio system 100 may also include one or more connection ports 130 configured to provide a connection to other devices. The connection ports 130 may be configured as charging ports for additional devices, AC adapter plugs, or audio input plugs.

The audio system 100 may provide audio playback from a remote device such as a mobile device 208 or other device coupled to the audio system 100. For example, the audio system 100 may be wirelessly coupled to the mobile device 208 using a Bluetooth or similar protocol. The audio system 100 and the beacon 102 may be paired with the mobile device 208 such that audio playback initiated on the mobile device 208 may be wirelessly transmitted to the audio system 100 for playback. The user may control the playback of the audio content using the control panel 112. Alternatively, the audio system 100 may include a local memory on which audio content may be stored for playback. Further yet, an audio source may be coupled to the audio system 100 using a wired connection using a connection port 130.

The audio system 100 may be portable such that it may be taken outdoors or in a vehicle. According to one aspect, outdoor enthusiasts, such as a golfer, may use the audio system 100 while out on a course playing golf. In such instances, the audio system 100 may be carried in a golf bag or in a golf cart, mounted to a metal surface of the cart using the magnetic mount 128. As described herein, the golfer may use the beacon 124 to trigger a shot information request to determine the information relating to the golfer's location, distance to a target or other gameplay information. The beacon 124 may be triggered by pressing an actuator 126, such as a button, touchpad or sensor on the beacon 124. The shot information request may be transmitted to the mobile device 208 which may determine the requested shot information and transmit such information to the audio system 100 to be played out as an audio signal from the speaker 110. The mobile device 208 may determine the shot information using any number of resources including but not limited to, geographic information, environmental information, gameplay history, or other information. Geographic information may be obtained from a GPS provider or GPS-enabled location service. Environmental information, such as course information, landmarks, distances, and other area information may be obtained from locally stored data or remote databases storing such information. Gameplay history and other information may similarly be retrieved or obtained from local or remote storage locations.

Figure 2:
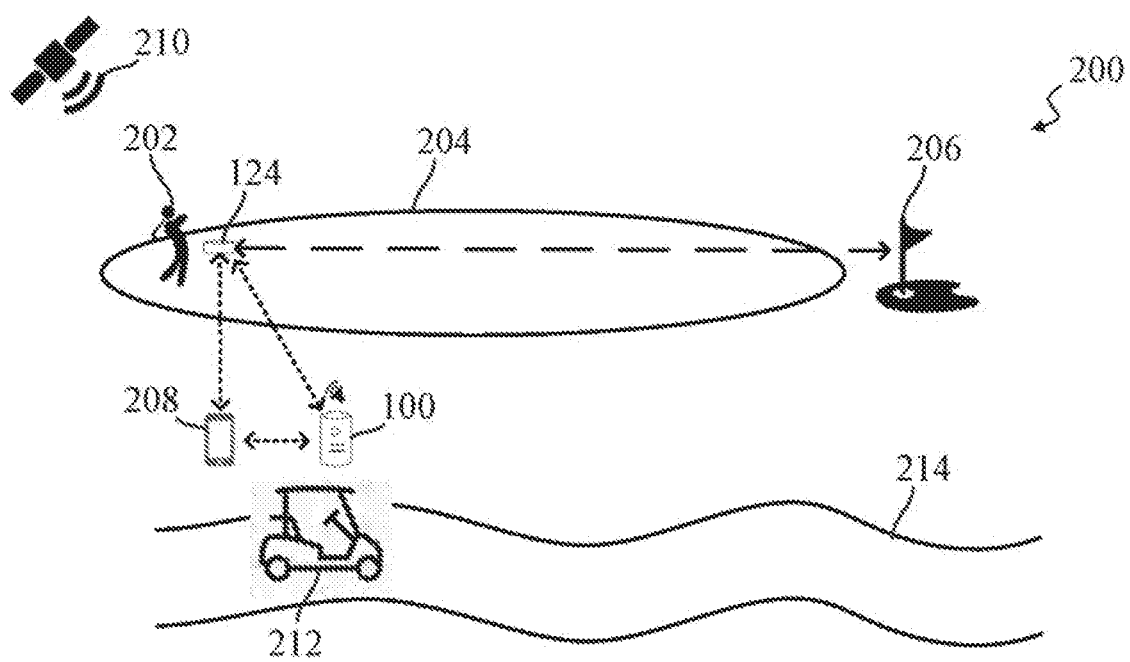
FIG. 2 depicts a usage scenario of an audio system according to an aspect of the present disclosure.

FIG. 2 depicts a usage scenario 200 of an audio system according to an aspect of the present disclosure. A golfer 202 may be playing on a course 204. According to one aspect, the golf course 204 may have published statistics and other information about the course in a database that may be accessible to the golfer 202. Such information may include hole maps, elevations, distances, and other information a golfer may desire during play. The golfer 202 may access the available course information via a website, mobile application or other source accessible by the golfer's mobile phone or other mobile device 208. The mobile device 208 may include or communicate with location services such as a global position system (GPS) or other location service that may interface with the mobile device 208 and any application or web-browser through which the golfer 202 may access course information.

According to one aspect, the golfer 202 may remove the beacon 124 from the speaker device 102 and carry the beacon 124 in a pocket such that the beacon 124 is consistently at the golfer's location and is easily accessible. For example, if the golfer is using a cart 212 and has parked the cart on a path 214, the golfer may keep the beacon 124 with him as he walks to the golf ball while the audio system remains in the cart 212, or mounted to the cart frame using the magnetic mount 128. Prior to taking a shot, the golfer 202 may wish to determine shot information, for example the distance from the golfer 202 to a target 206, such as a hole or flagstick. Knowing the distance to the target 206 allows the golfer 202 to determine more accurately an appropriate club to hit as well as the appropriate swing speed and strength. The golfer may retrieve the beacon 124 from a pocket and press the actuator 126. To avoid having to remove the beacon 124 from a pocket, the golfer may trigger the beacon 124 through the golfer's pocket by pressing the actuator 126. The beacon 124 may transmit a request to the mobile device 208. In an alternative configuration, the request may be transmitted to a controller resident on the speaker device 102.

In embodiments, the beacon 124 includes a GPS antenna to provide accurate information about its location when it is physically separate from the audio system 100. For example, the audio system 100 may be placed on a golf bag or golf cart and the beacon 124 may be carried on or worn by a user during play. In some instances, the cart or bag may be at one location on the golf course, such as a cart path or parking area, and the user may be addressing the user's golf ball at a second location remote from the audio system, such as on a fairway. More accurate shot information may be provided to the user if the beacon 124 is carried to close proximity to the golf ball and is used to determine the GPS location instead of the audio system 100.

According to one aspect of the present disclosure, the beacon 124 may trigger a listening request that may including a request for shot information. Actuating the beacon 124 may activate the microphone 122, which may be located on the speaker device 102 or the mobile device 208, and put the audio system into a listening mode, to which a golfer may issue verbal instructions, commands or requests. The verbal instructions may be processed using a voice assistant capability of the mobile device 208 or an application on the mobile device 208.

The mobile device 208 and its controller may receive the shot information request and consult the environmental information in conjunction with location information obtained by the mobile device 208, received from a GPS satellite 210 for example. The mobile device 208 may correlate the location information obtained from the GPS system or other location service with the environmental information to determine where on the course the mobile device 208 or beacon 124 are located. From the correlated location, the mobile device 208 may determine the distance from the beacon 124 or audio system 100 to the target 206. Knowing the distance to the target 206, the golfer 202 may select an appropriate club and adapt their golf swing accordingly.

The mobile device 208 may convert the shot information into an audio signal and transmit the audio signal to the audio system 100. The audio system 100 may receive the audio signal and, if already playing audio content, adapt the audio and playout the audio signal indicating the shot information, i.e., the distance to the target 206. The audio system may adapt the currently playing audio by pausing the audio, attenuating the volume of the audio content, or the like. Alternatively, the audio system may include the capability to receive and convert the shot information to an audio signal. Previously playing audio content may resume playing normally after the shot information is played out.

When the beacon 124 is not in use, the golfer 202 may replace the beacon 124 into the recess 104 of the speaker device 102, where magnetic materials may retain the beacon 124 and the battery of the beacon 124 may be recharged wirelessly by the charging interface 106. Such wireless charging systems are known in the art.

As described herein, aspects of the present disclosure provide one or more audio systems configured to broadcast, or otherwise transmit audio signals, including audio signals relating to shot information, from one or more speakers. The audio systems may include a beacon 124 used to trigger a shot information request that is transmitted to a controller, such as a mobile phone application, or similar device. The audio system may receive the shot information from the mobile device and play such information out as audio. The audio system's functionality may be embodied, fully or in part, in a computing system.

Figure 3A:
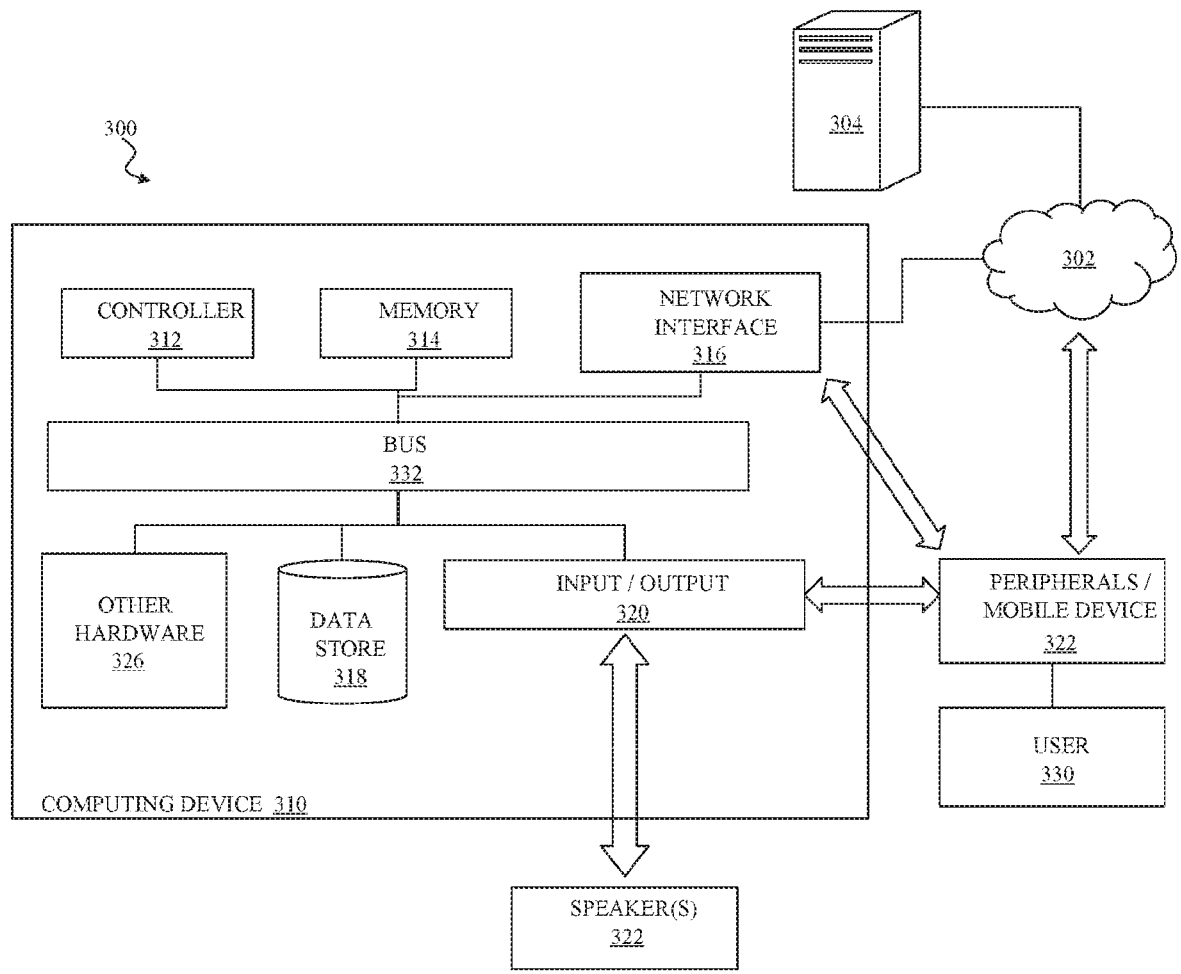
FIG. 3A depicts a hardware architecture of an audio system according to an aspect of the present disclosure.

FIG. 3A depicts a computer system 300 according to one aspect of the present disclosure. In general, the computer system 300 may include a computing device 310, such as a special-purpose computer designed and implemented for directing and controlling the output of audio signals. The computing device 310 may be or include data sources, client devices, and so forth. For example, the computing device 310 may include a microprocessor installed and disposed within an internal area a mobile device. In certain aspects, the computing device 310 may be implemented using hardware or a combination of software and hardware. The computing device 310 may be a standalone device, a device integrated into another entity or device, a platform distributed across multiple entities, or a virtualized device executing in a virtualization environment. According to one aspect, the computing device 310 may be a mobile device, such as a mobile phone, tablet, phablet, PC or the like. According to another aspect, the computing device 310 may be a speaker device.

The computing device 310 may communicate across a network 302. The network 302 may include any data network(s) or internetwork(s) suitable for communicating data and control information among participants in the computer system 300. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computer system 300.

The network 302 may also include a combination of data networks and need not be limited to a strictly public or private network.

The computing device 310 may communicate with an external device 304. The external device 304 may be any computer or other remote resource that connects to the computing device 310 through the network 302. This may include any of the servers or data sources described herein, including servers, content providers, databases or other sources for shot information to be used by the devices as described herein.

In general, the computing device 310 may include a controller 312, a memory 314, a network interface 316, a data store 318, and one or more input/output interfaces 320. The computing device 310 may further include or be in communication with peripherals 322 and other external input/output devices that might connect to the input/output interfaces 320.

The controller 312 may be implemented in software, hardware or a combination of software and hardware. According to one aspect, the controller 312 may be implemented in application software running on a mobile device. Alternatively, the controller 312 may include a processor or other processing circuitry capable of processing instructions for execution within the computing device 310 or computer system 300. The controller 312, as hardware, may include a single-threaded processor, a multi-threaded processor, a multi-core processor and so forth. The controller 312 may be capable of processing instructions stored in the memory 314 or the data store 318.

The memory 314 may store information within the computing device 310. The memory 314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 314 may store program instructions, program data, executables, and other software and data useful for controlling operation of the computing device 310 and configuring the computing device 310 to perform functions for a user. The memory 314 may include a number of different stages and types of memory for different aspects of operation of the computing device 310. For example, a processor may include on-board memory and/or cache for faster access to certain data or instructions, and a separate, main memory or the like may be included to expand memory capacity as desired. All such memory types may be a part of the memory 314 as contemplated herein.

The memory 314 may, in general, include a non-volatile computer readable medium containing computer code that, when executed by the computing device 310 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 314 is depicted, it will be understood that any number of memories may be usefully incorporated into the computing device 310.

The network interface 316 may include any hardware and/or software for connecting the computing device 310 in a communicating relationship with other resources through the network 302. This may include remote resources accessible through the Internet (e.g. audio streaming), as well as local resources available using short range communications protocols using, e.g., physical connections (e.g., Ethernet), radio frequency communications (e.g., Wi-Fi, Bluetooth), optical communications (e.g., fiber optics, infrared, or the like), ultrasonic communications, or any combination of these or other media that might be used to carry data between the computing device 310 and other devices. The network interface 316 may, for example, include a router, a modem, a network card, an infrared transceiver, a radio frequency (RF) transceiver for receiving AM/FM or satellite radio sources, a near field communications interface, a radio-frequency identification (RFID) tag reader, or any other data reading or writing resource or the like.

The network interface 316 may include any combination of hardware and software suitable for coupling the components of the computing device 310 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 302 such as the Internet. This may also include hardware/software for a WiMax connection or a cellular network connection (using, e.g., CDMA, GSM, LTE, or any other suitable protocol or combination of protocols). The network interface 316 may be included as part of the input/output devices 320 or vice-versa.

The data store 318 may be any internal memory store providing a computer-readable medium such as a disk drive, an optical drive, a magnetic drive, a flash drive, or other device capable of providing mass storage for the computing device 310. The data store 318 may store computer readable instructions, data structures, program modules, and other data for the computing device 310 or computer system 300 in a non-volatile form for relatively long-term, persistent storage and subsequent retrieval and use. For example, the data store 318 may store an operating system, application programs, program data, databases, files, and other program modules or other software objects and the like.

The input/output interface 320 may support input from and output to other devices that might couple to the computing device 310. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 316 for network communications is described separately from the input/output interface 320 for local device communications, these two interfaces may be the same, or may share functionality, such as where a USB port 370 is used to attach to a Wi-Fi accessory, or where an Ethernet connection is used to couple to a local network attached storage. The input/output interface 320 may further output audio signals to the speakers 322 of the audio system, as described herein.

A peripheral 322 may include any device used to provide information to or receive information from the computing device 310. This may include human input/output (I/O) devices such as a keyboard, a mouse, a mouse pad, a track ball, a joystick, a microphone, a foot pedal, a camera, a touch screen, a scanner, or other device that might be employed by the user 330 to provide input to the computing device 310. This may also or instead include a display, a printer, a projector, a headset or any other audiovisual device for presenting information to a user. The peripheral 322 may also or instead include a digital signal processing device, an actuator, or other device to support control of or communication with other devices or components. In one aspect, the peripheral 322 may serve as the network interface 316, such as with a USB device configured to provide communications via short range (e.g., Bluetooth, Wi-Fi, Infrared, RF, or the like) or long range (e.g., cellular data or WiMax) communications protocols. In another aspect, the peripheral 322 may augment operation of the computing device 310 with additional functions or features, such as a GPS device, or other device. In another aspect, the peripheral 322 may include a storage device such as a flash card, USB drive, or other solid-state device, or an optical drive, a magnetic drive, a disk drive, or other device or combination of devices suitable for bulk storage. More generally, any device or combination of devices suitable for use with the computing device 310 may be used as a peripheral 322 as contemplated herein.

Other hardware 326 may be incorporated into the computing device 310 such as a co-processor, a digital signal processing system, a math co-processor, a graphics engine, a video driver, a camera, a microphone, additional speakers, and so forth. The other hardware 326 may also or instead include expanded input/output ports, extra memory, additional drives, and so forth.

A bus 332 or combination of busses may serve as an electromechanical backbone for interconnecting components of the computing device 310 such as the controller 312, memory 314, network interface 316, other hardware 326, data store 318, and input/output interface. As shown in the figure, each of the components of the computing device 310 may be interconnected using a system bus 332 in a communicating relationship for sharing controls, commands, data, power, and so forth.

Figure 3B:
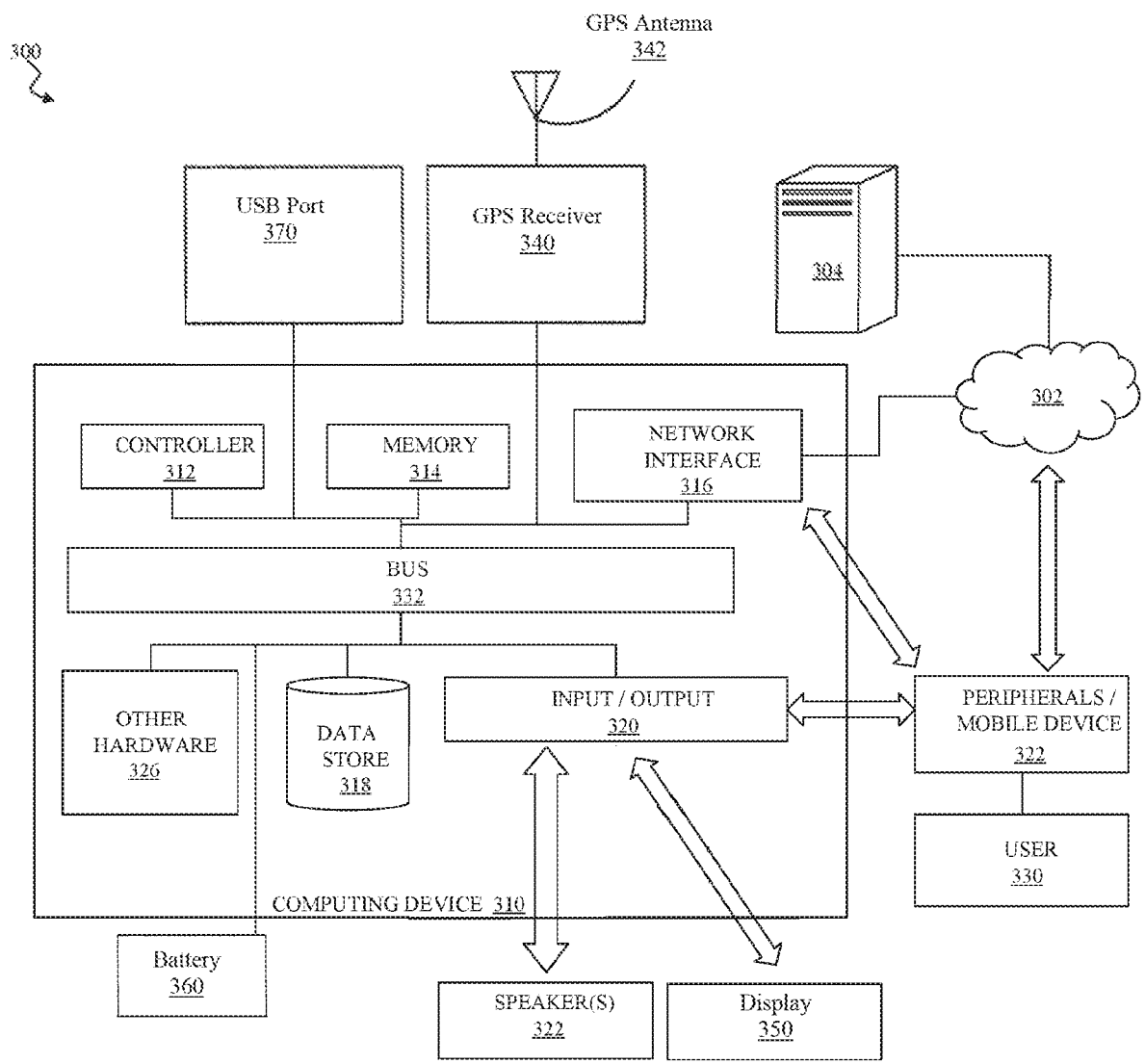
FIG. 3B depicts a hardware architecture of an audio system according to an aspect of the present disclosure.

FIG. 3B depicts a computer system 300 according to other aspects of the present disclosure. In certain embodiments the I/O interface facilitates communication with input and output devices for interacting with a user. For example, the I/O interface may communicate with one or more devices such, as a user-input device and/or a display 350 which may be instantiated on the device described herein or on a separate device such as a mobile device 208, which enable a user to interact directly with the controller 312 via bus 332. In these embodiments, the computer system may further include a display 350 to provide visual output to the user. The user-input device may include one or more push-buttons, a touch screen, or other devices that allows a user to input information. The display 350 may include any of a variety of visual displays, such as a viewable screen, a set of viewable symbols or numbers, and so on.

The GPS receiver 340 includes GPS functionality or another location service in an installed application. A GPS antenna 342 enables the device to obtain location information from a GPS satellite 210. In some embodiments, a GPS antenna may be physically located on the beacon 124 to enable the audio system 100 to locate the position of the beacon 124 if it is separated from the audio system 100.

A power source (not shown) may provide energy to the audio system 100. The power source may be any power source commonly known in the art, including a rechargeable battery 360 and/or an AC power connecter for recharging the device.

Figure 11:
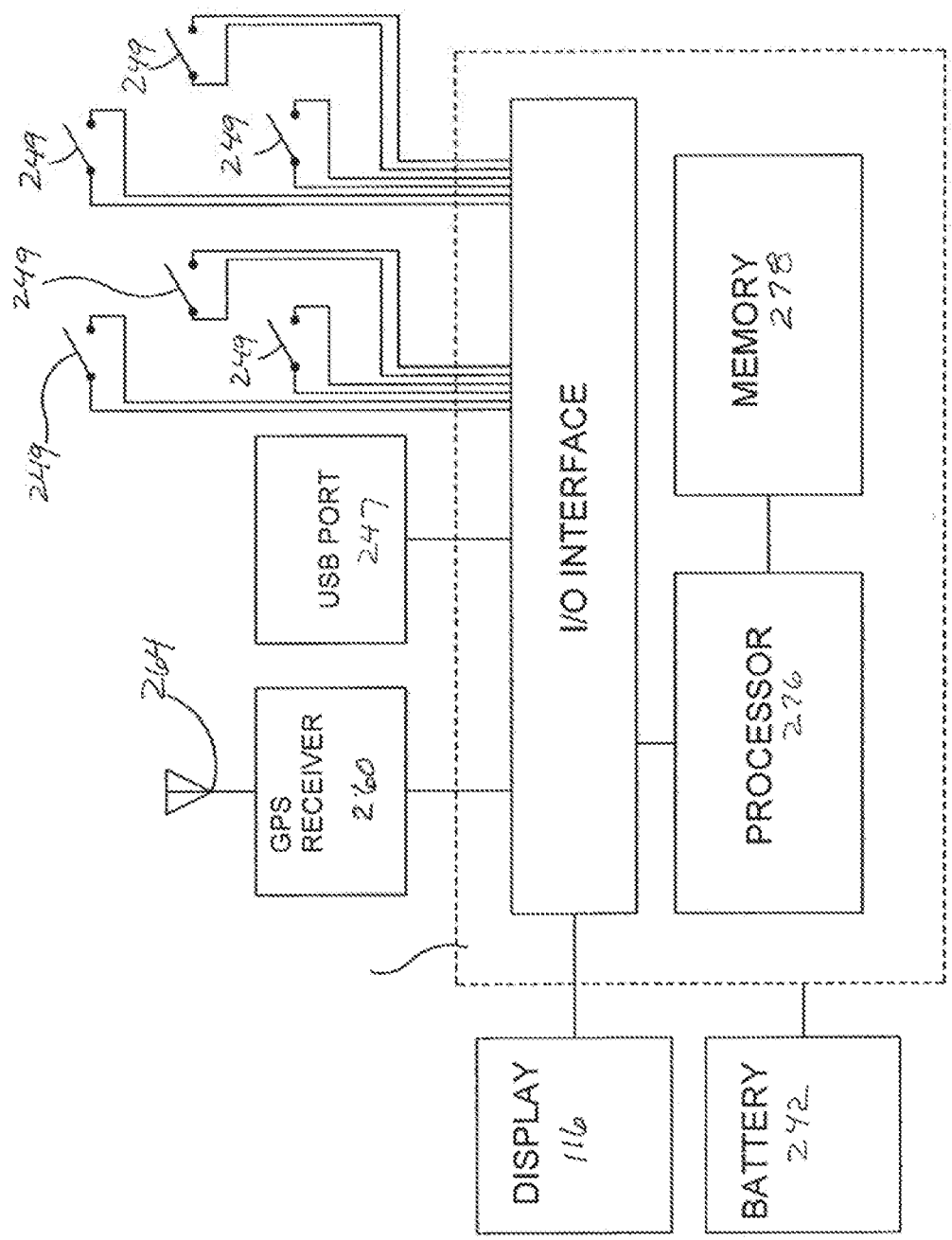
FIG. 11 depicts a hardware architecture of an audio system including a visual display according to an aspect of the present disclosure.

FIG. 11 depicts a computer system according to other aspects of the present disclosure. In certain embodiments the I/O interface facilitates communication with input and output devices for interacting with a user. For example, the I/O interface may communicate with one or more devices (not shown) via a USB port 247 and/or a display 116 to provide visual output to the user which may be instantiated on a device described herein or on a separate device, which enable a user to interact directly with the processor 276. The system includes a GPS Receiver 260 and GPS antenna 264 to localize the computer system in its environment (e.g. at a location within a golf course). The computer system also comprises memory 278. Battery 242 powers the computer system.

Figure 4:
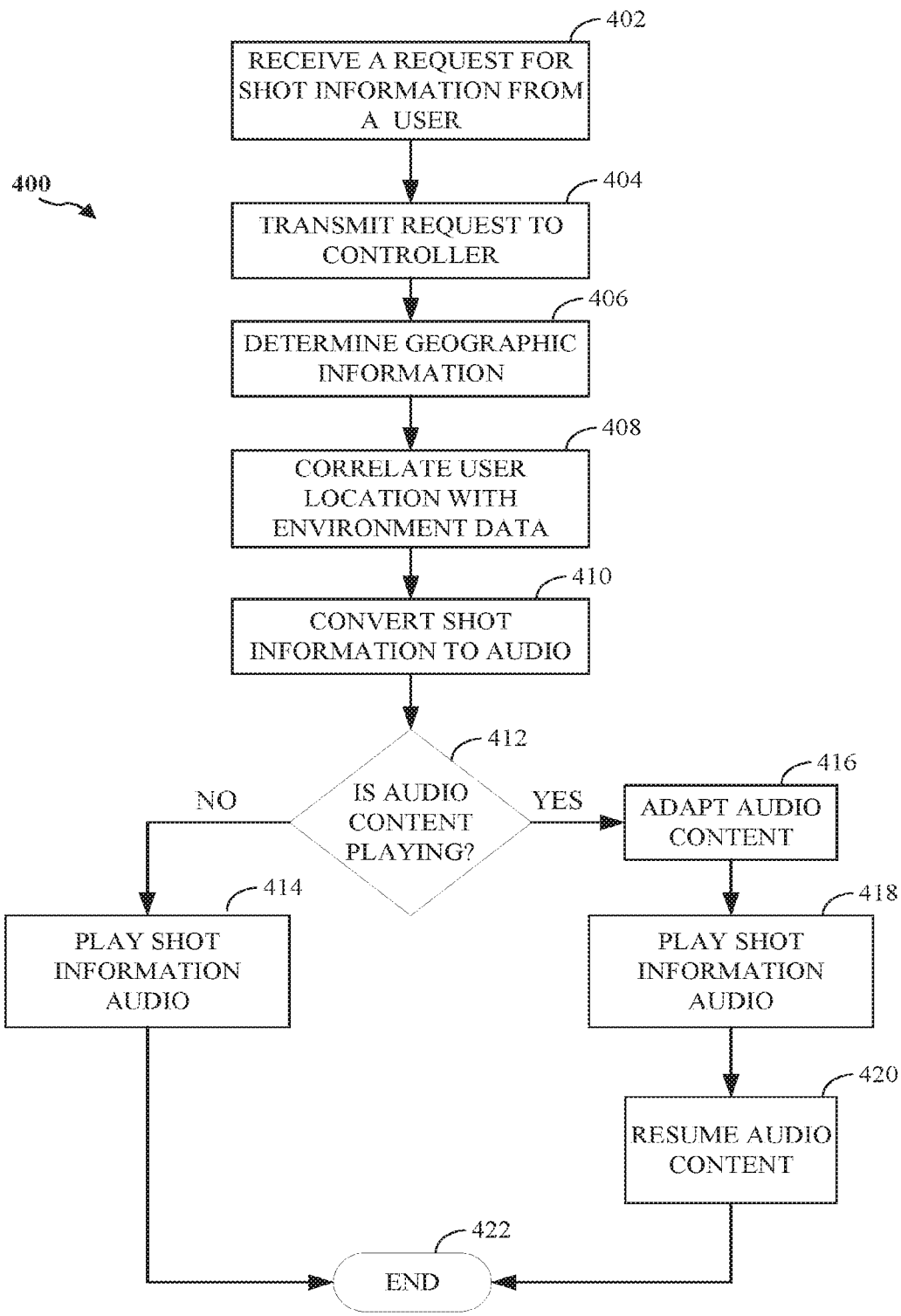
FIG. 4 depicts a method of determining a shot information according to an aspect of the present disclosure.

FIG. 4 depicts a method of obtaining shot information according to an aspect of the present disclosure. As described herein, and shown in block 402, the audio system may receive a request for shot information. A user, such as a golfer, wishing to receive information on the user's location or surrounding environmental features, may initiate the request by actuating a beacon 124. The beacon 124 may be a portable and removable component of the audio system that is paired, via a wireless protocol like Bluetooth, to the audio system and/or a remote device.

Figure 3C:
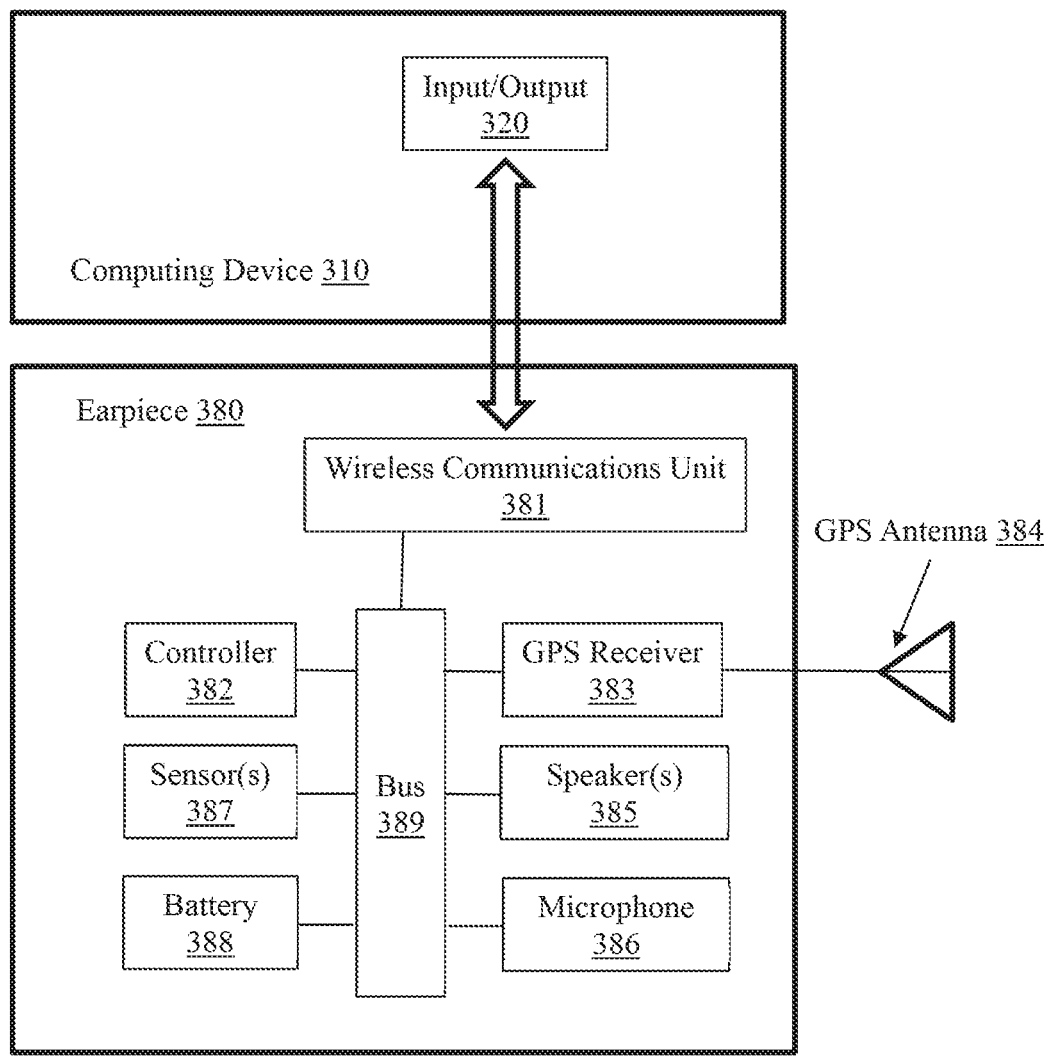
FIG. 3C depicts a hardware architecture of an earpiece beacon according to an aspect of the present disclosure.

In some embodiments, the beacon may include an earpiece such as an earbud, or pair of earbuds, as described in greater detail below. FIG. 3C depicts a hardware architecture of an earpiece beacon according to an aspect of the present disclosure. The earpiece beacon 380 is in wireless communication with the input/output interface 320 of computing device 310 of FIG. 3B via wireless communications unit 381. A controller 382 in operational connectivity with controller 312 of computing device 310 controls the functions of the earpiece beacon 380. The earpiece beacon 380 includes a GPS Receiving Unit 383 and GPS antenna 384 to localize the beacon in its environment (e.g. at a location within a golf course). The earpiece beacon 380 includes speaker(s) 385 to provide audio output to the user (e.g. shot information) and a microphone 386 to receive voice input from a user. Sensor(s) 387 detect conditions related to the earpiece beacon 380 such as positioning near a user's ear and tap signals from a user. A rechargeable battery 388 supplies power to the components of the earpiece beacon 380. All components of the earpiece beacon 380 are interconnected by bus 389.

As shown in block 404, the request may be transmitted to a controller on a mobile device, such as a GPS-enabled mobile device, to which the audio system is wirelessly coupled or coupled using an appropriate data transmission cable. Alternatively, the GPS-enabled mobile device may be part of the audio system itself, such as a speaker device. As shown in block 406, the controller may determine the user's geographic location using the mobile device's native GPS functionality or another location service in an installed application. Application software on the remote device may include local environmental information relating to the user's location. For example, the application software may include maps, elevations, distances, crowd sound effects, or the like relating to a golf course and or gameplay on which the user is located.

As shown in block 408, the controller, relying on the user's geographic location, may correlate the user's location with the environmental data of the application software to generate the shot information requested. The shot information may include information as to the user's location in or on a defined area, such as a golf course, various landmarks, markers, or the like. According to one aspect, the application software may include or access a database storing shot information of a number of golf courses. Based on the geographic location, the controller may determine the golf course on which the user is located. The controller may correlate the geographic location with the location information of the identified golf course to generate the shot information. The shot information may also include an elevation, distance, crowd sound effects, or other gameplay information relating to the user's location and target, such as a flagstick, bunker, or other known landmark.

As shown in block 410, the shot information may be converted into an audio signal capable of being played out by the audio system. For example, the shot information may indicate that the user is 100 yards from the flagstick of the current hole being played. The shot information, for example, may be converted to an audio signal that states "You are 100 yards from the flagstick."

As shown in block 412, the audio system may determine if audio content is already playing from the speakers when the shot information audio signal is ready to be played. If there is no audio currently being played out, the audio system may initiate the playback of the shot information audio signal, as shown in block 414. If, however, audio content is being played, the audio system may adapt the content, as shown in block 416. The controller may attenuate the volume of the current audio, pause the current audio, or the like. Once the audio content is adapted accordingly, the audio system may play back the shot information audio signal, as shown in block 418. Once the shot information is played back, as shown in block 420, the audio system may resume playback of the audio content.

As shown in block 422, the request for shot information may be completed and the audio system may continue to operate playing audio content until another request is initiated.

While aspects of the present disclosure provide for a pressure activated beacon, using a button or touch pad, one skilled in the art will recognize that other triggers may be implemented to initiate a shot information request, including tap signals or voice commands.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

In some embodiments, the beacon 124 may be instantiated in an earpiece that the user wears during use of the system. The term "earpiece" as used herein is a speaker placed inside or held near to the ear of a user. In some embodiments, an earpiece may further include an arm or bow configured to wrap around the back of a user's ear to hold it in place. In some embodiments, an earpiece may further include an arm configured to wrap around a portion of a user's head or neck to hold it in place. In some embodiments, the earpiece may include speakers for both of a user's ears. In some embodiments, an earpiece may further include an accessory such as a clip to attach the earpiece to a cap or glasses to be worn by a user during play. In some embodiments, an earpiece further includes a microphone 122 to receive audio (verbal) input from a user. In some embodiments, an earpiece may further include one or more actuators configured to receive physical input from a user such as a "touch" or "tap". The actuator may be a mechanical device such as a switch, microswitch, button, dial, or slider, or it may be a sensor such as a pressure sensor detect pressure from a user's finger.

In embodiments wherein the beacon 124 is instantiated in an earpiece, the earpiece is in wireless connectivity to the audio system 100 via a defined communications protocol such that the earpiece is recognized by the audio system 100 as an allowed input/output (I/O) device. The system 100 will perform handshaking operations using the protocol to detect and link with the earpiece to activate the beacon functionality in the earpiece. In embodiments, the audio system 100 may link the earpiece to a mobile device 208 such as a cellular telephone to enable the earpiece to provide audio functionality for the mobile device 208, allowing the system to provide cellular communications.

The earpiece may have control circuitry, wireless communications circuitry (e.g., one or more radio-frequency transceivers for supporting wireless communications over links to the audio system, speaker(s) and may have additional components such as microphones, one or more sensors (e.g., one or more optical proximity sensors including light-emitting diodes for emitting infrared light or other light and including light detectors that detect corresponding reflected light), and accelerometers. Speakers may play audio into the ears of a user. Microphones may gather audio data such as the voice of a user who is making a telephone call. Accelerometers may detect when ear buds are in motion or are at rest. During operation of the earpiece, a user may supply tap commands (e.g., double taps, triple taps, other patterns of taps, single taps, etc.) to control the operation of the earpiece. Tap commands may be detected using accelerometer. Optical proximity sensor input and other data may be used when processing tap commands to avoid false tap detections.

Control circuitry on the earpiece and control circuitry of device 100 may be used to run software on the earpiece and device 100, respectively. During operation, the software running on control circuitry may be used in gathering sensor data, user input, and other input and may be used in taking suitable actions in response to detected conditions. As an example, control circuitry may be used in handling audio signals in connection with the shot information from the audio system 100 when it is determined that a user is wearing the earpiece. In some embodiments, control circuitry may be linked to a user's cellular telephone to route incoming cellular telephone calls to the earpiece. Control circuitry may also be used in coordinating operation between a pair of earpieces, such as ear buds 500, that are paired with a common host device (e.g., device 102), handshaking operations, etc.

In some situations, it may be desirable to accommodate stereo playback from the earpiece. This can be handled by designating one speaker of a pair of speakers (one placed at each of the user's ears) associated with an earpiece as a primary earpiece and the second speaker as a secondary earpiece. For example, the earpiece may include a pair of earbuds as described further below. The primary earpiece may serve as a slave device while device 102 serves as a master device. A wireless link between device 100 and the primary earpiece may be used to provide the primary earpiece with stereo content. The primary earpiece may transmit one of the two channels of the stereo content to the secondary earpiece for communicating to the user (or this channel may be transmitted to the secondary earpiece from device 102). Microphone signals (e.g., voice information from the user during a telephone call) may be captured by using microphone 122 in the primary earpiece and conveyed wirelessly to device 100.

Sensors may include strain gauge sensors, proximity sensors, ambient light sensors, touch sensors, force sensors, temperature sensors, pressure sensors, magnetic sensors, accelerometers (see, e.g., accelerometers), gyroscopes and other sensors for measuring orientation (e.g., position sensors, orientation sensors), microelectromechanical systems sensors, and other sensors. Proximity sensors in sensors may emit and/or detect light and/or may be capacitive proximity sensors that generate proximity output data based on measurements by capacitance sensors (as examples). Proximity sensors may be used to detect the presence of a portion of a user's ear to the earpiece and/or may be triggered by the finger of a user (e.g., when it is desired to use a proximity sensor as a capacitive button).

Audio ports may be used for gathering sound for a microphone 122 and/or for providing sound to a user (e.g., audio associated with shot information, a telephone call, media playback, an audible alert, etc.). For example, an audio port may be a speaker port that allows sound from speaker to be presented to a user. Sound may also pass through additional audio ports (e.g., one or more perforations may be formed in housing to accommodate microphone 122).

Sensor data (e.g., proximity sensor data, accelerometer data or other motion sensor data), wireless communications circuitry status information, and/or other information may be used in determining the current operating state of the earpiece. Proximity sensor data may be gathered using proximity sensors located at any suitable locations in a housing of the earpiece.

A notable earpiece includes an earbud or pair of earbuds. The term "earbud" as used herein is an earpiece designed to be inserted into or to rest just outside of the outer ear canal. One earbud may be used, or a pair of earbuds may be used, one in each of a user's ear.

Figure 5:
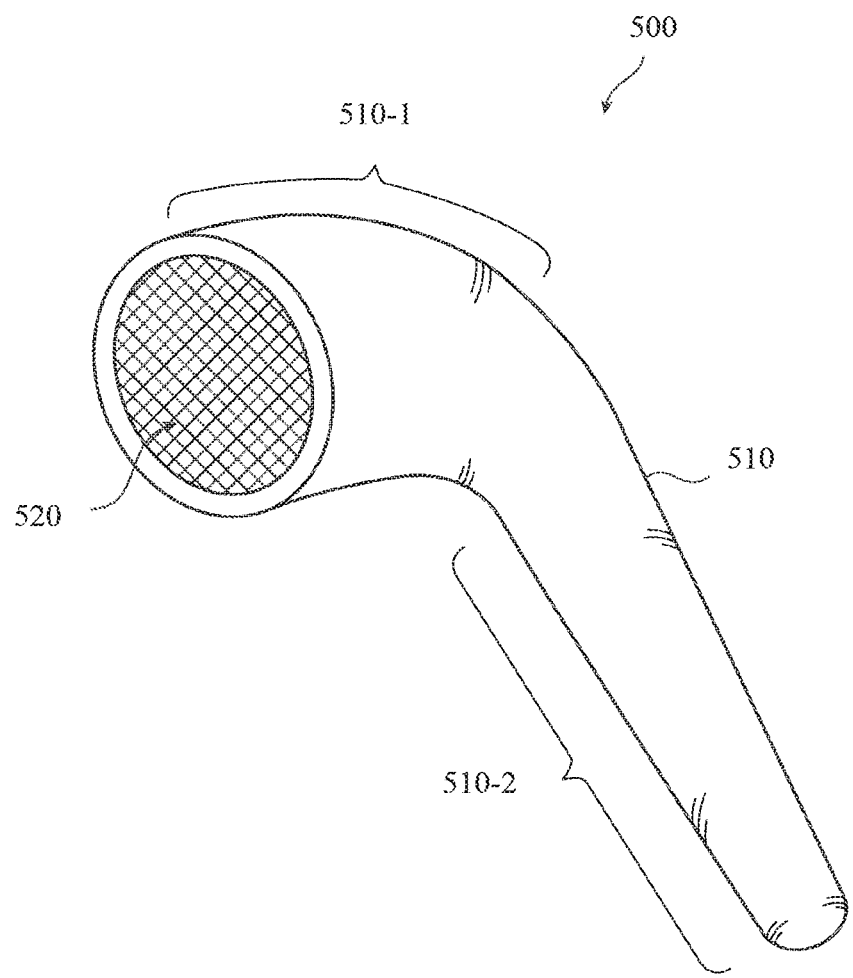
FIG. 5 is a perspective view of an illustrative ear bud in accordance with an embodiment of the present disclosure.

FIG. 5 is a perspective view of an illustrative ear bud. As shown in FIG. 5, ear bud 500 may include a housing such as housing 510. Housing 510 may have walls formed from plastic, metal, ceramic, glass, sapphire or other crystalline materials, fiber-based composites such as fiberglass and carbon-fiber composite material, natural materials such as wood and cotton, other suitable materials, and/or combinations of these materials. Housing 510 may have a main portion such as main body 510-1 that houses audio port 520 and a stem portion such as stem 510-2 or other elongated portion that extends away from main body portion 510-1. During operation, a user may grasp stem 510-2 and, while holding stem 510-2, may insert main portion 510-1 and audio port 520 into the ear. When ear buds 500 are worn in the ears of a user, stem 510-2 may be oriented vertically in alignment with the Earth's gravity (gravity vector) and verticality may be determined by a sensor (not shown).

Figure 6:
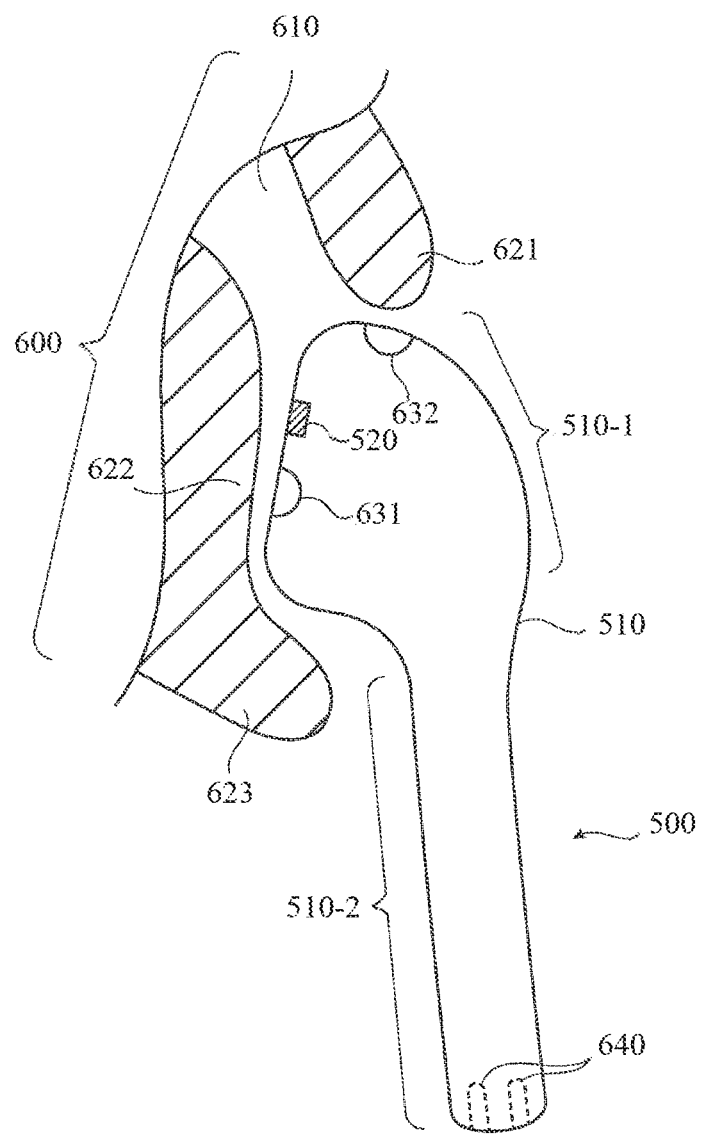
FIG. 6 is a side view of an illustrative ear bud located in an ear of a user in accordance with an embodiment of the present disclosure.

FIG. 6 is a side view of ear bud 500 in an illustrative configuration in which ear bud 500 has two proximity sensors 631 and 632. Sensors 631 and 632 may be mounted in main body portion 510-1 of housing 510. If desired, additional sensors (e.g., one, two, or more than two sensors that are expected to produce no proximity output when ear buds 500 are being worn in a user's ears and which may therefore sometimes be referred to as null sensors) may be mounted on stem 510-2. Other proximity mounting arrangements may also be used. In the example of FIG. 6, there are two proximity sensors on housing 510. More proximity sensors or fewer proximity sensors may be used in ear bud 500, if desired. An audio port for a microphone (not shown) may be positioned in stem 510-2.

As shown in FIG. 6, ear bud 500 may be inserted into the ear (ear 600, shown in schematic cross-section) of a user, so that speaker port 520 is aligned with ear canal 610. Ear 600 may have features such as concha 621, tragus 622, and antitragus 623. Proximity sensors such as proximity sensors 631 and 632 may output positive signals when ear bud 500 is inserted into ear 600. Sensor 631 may be a tragus sensor and sensor 632 may be a concha sensor or sensors such as sensors 631 and/or 632 may be mounted adjacent to other portions of ear 600.

In addition to sensor and accelerometer data, control circuitry may use information from contact sensors in ear buds 500 to help determine earbud location. For example, a contact sensor may be coupled to the electrical contacts (see, e.g., contacts 640 of FIG. 3) in an ear bud that are used for charging the ear bud when the ear bud is in a case (e.g. a recess in audio system 100). Control circuitry can detect when contacts 640 are mated with case contacts and when ear buds 500 are receiving power from a power source in the case. Control circuitry may then conclude that ear buds 500 are in the storage case. Output from contact sensors can therefore provide information indicating when ear buds are located in the case and are not in the user's ear.

The accelerometer data from accelerometers may be used to provide control circuitry with motion context information. The motion context information may include information on the current orientation of an ear bud (sometimes referred to as the "pose" or "attitude" of the ear bud) and may be used to characterize the amount of motion experienced by an ear bud over a recent time history (the recent motion history of the ear bud).

A user may supply tap input to ear buds 500. For example, a user may supply double taps, triple taps, single taps, and other patterns of taps by striking a finger against the housing 510 of an ear bud 500 to control the operation of ear buds 500 (e.g., to request shot information from device 100, answer incoming telephone calls to mobile device 208 (mobile telephone), to end a telephone call, to navigate between media tracks that are being played back to the user by device 100, to make volume adjustments, to play or to pause media, etc.). Control circuitry may process output from accelerometers to detect user tap input. In some situations, pulses in accelerometer output will correspond to tap input from a user. In other situations, accelerometer pulses may be associated with inadvertent tap-like contact with the ear bud housing and can be ignored.

It may be desirable to adjust the operation of the earpiece based on the current state of the earpiece. For example, it may be desirable to activate more functions of the earpiece when the earpiece is located at a user's ear(s) and being actively used than when not in use. Control circuitry may keep track of the current operating state (operating mode) of the earpiece by implementing a state machine. Control circuitry may, for example, use sensor data and other data to determine whether the earpiece (e.g. earbud(s)) is in a user's ears or not in a user's ears and may adjust the operation of the earpiece accordingly.

For example, a state machine may determine that the earpiece is not in position at a user's ear(s) and configure the audio system to provide audio through speaker 110 on speaker device 102 in a "public" state. Determining a public state may include determining that the earpiece is in the recess 122 of the audio system 100, such as by determining that electrical contacts (see, e.g., contacts 640 of FIG. 6) in an earpiece that are used for charging the earpiece are mated with charger contacts and receiving power from a power source in audio system 100. If the earpiece (earbud) is not in the charging recess, but is not positioned properly at a user's ear, the state machine may determine that the earpiece is in an "inactive" state. Determination that an earpiece (earbud) is not properly positioned at a user's ear may include absence of signals from proximity sensors such as 631 and 632 of FIG. 6, an indication from a sensor that stem 510-2 is not in a vertical pose, and/or other sensor information. When the earpiece is in an inactive state, the audio system may be configured to provide audio through speaker 110 on speaker device 102. If the earpiece (earbud) is positioned properly at a user's ear, the state machine may determine that the earpiece is in an "active" state. Determination that an earpiece (earbud) is properly positioned at a user's ear may include presence of signals from proximity sensors such as 631 and 632 of FIG. 6, an indication from a sensor that stem 510-2 is in a vertical pose, and/or other sensor information. When the earpiece is in an active state, the audio system may be configured to provide audio through an audio port or speaker on the earpiece (e.g. audio port 520 on earbud 500) in a "private" state and may or may not provide audio through speaker 110 on the audio device 102.

When the earpiece is in an active state, the earpiece functions as a user I/O device to control the audio system 100 and allows the user to control the audio states. For example, a tap signal on the earpiece may signal a request for shot information to the audio system 100, which then provides audio shot information to the earpiece. Other tap signals may be used to provide other functions such as described above.

One can appreciate that a user may wish to customize the audio output to different options depending on circumstances. For example, a user may want to select which speaker provides audio output. A user may prefer using the system in a public state when a plurality (e.g. a pair or foursome) of golfers is present, and a private state when golfing alone. In some embodiments, when the earpiece is in an active state, a user may toggle between a public state, in which audio is provided through speaker 110, and a private state, in which audio is provided through the earpiece. For example, audio including music may be provided through speaker 110 and shot information may be provided only to the speaker on the earpiece after a tap signal. If the earpiece is also linked to a user's mobile device 208, audio input/output associated with the mobile device 208 may be provided only to the earpiece in a private state, and not through speaker 110. A specific tap signal may be used to configure the system 100 in a "telephone" state. A user may also wish to place the system 100 into a "silent" state in which all input to the earpiece is blocked, such as when taking a shot.

For illustration, a golfer using the audio system 100 with other golfers may choose to travel around a golf course with the system in a public state so all golfers can hear the audio output (e.g. music or general course information provided by the course), toggle to the private state as part of a request for shot information, toggle to the silent state while taking a shot, and toggle back to the public state after taking the shot. Each change in state may be enacted by a tap signal on the earpiece.

The audio system 100 may be configured to link to a plurality of earpiece beacons when a plurality of users are golfing together. For example, two or more golfers having earpieces with the defined communications protocol may link their earpieces to a common audio system 100. Each earpiece has a unique identifier so that the audio system can recognize each earpiece as a beacon and send and receive signals, audio and other communications to a specific earpiece controlled by an individual golfer.

In some embodiments, the audio system 100 further includes a visual display integral to the audio device 102 to provide display of visual information in addition to audio information. One can appreciate that inclusion of an integral display in an audio device 102 may require a generally planar configuration of at least a portion of the device to provide a suitable display and not a generally cylindrical configuration as shown in FIG. 1.

In some embodiments including a digital display, the device 702 has a planar and generally rectangular front face having rounded corners, the front face with a display screen, a housing having a top face, a bottom face and two lateral side faces that are generally rectangular with rounded corners, and a generally rectangular-shaped rearward face with rounded corners and a central projection. A magnet may be positioned in an interior of a housing at the central projection, the housing having an exterior planar surface at the magnet, the exterior planar surface conforming in size to the magnet. In embodiments, the rearward side has a projection that extends rearwardly at least 0.06 inches and less than 0.25 inches.

Figure 7A:
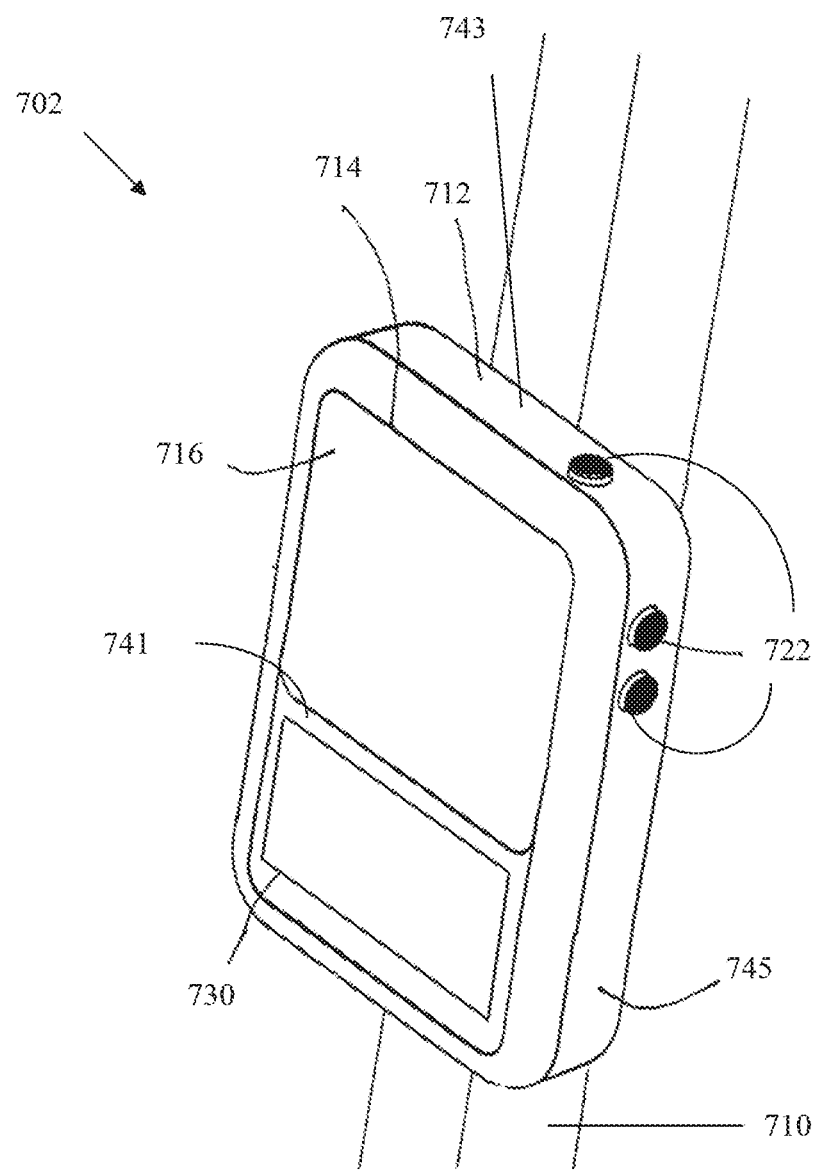
FIG. 7A is a perspective view showing the audio system including a visual display attached to an upright steel support member of the golf cart according to an aspect of the present disclosure.
Figure 7B:
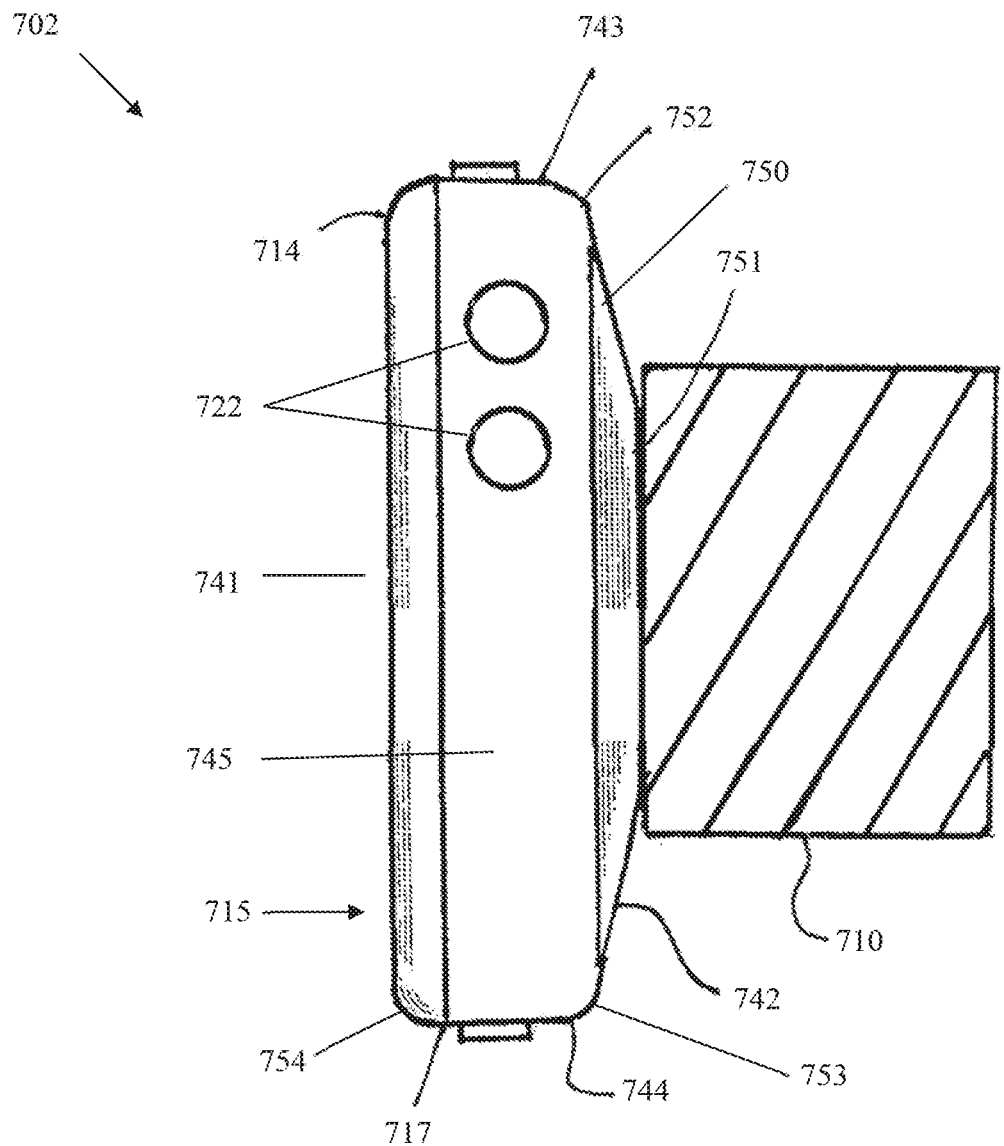
FIG. 7B is a side view of the audio system including a visual display attached to a metal plate with a rear concavity of the rangefinder illustrating the standoff of the device from the surface of the metal plate according to an aspect of the present disclosure.
Figure 7C:
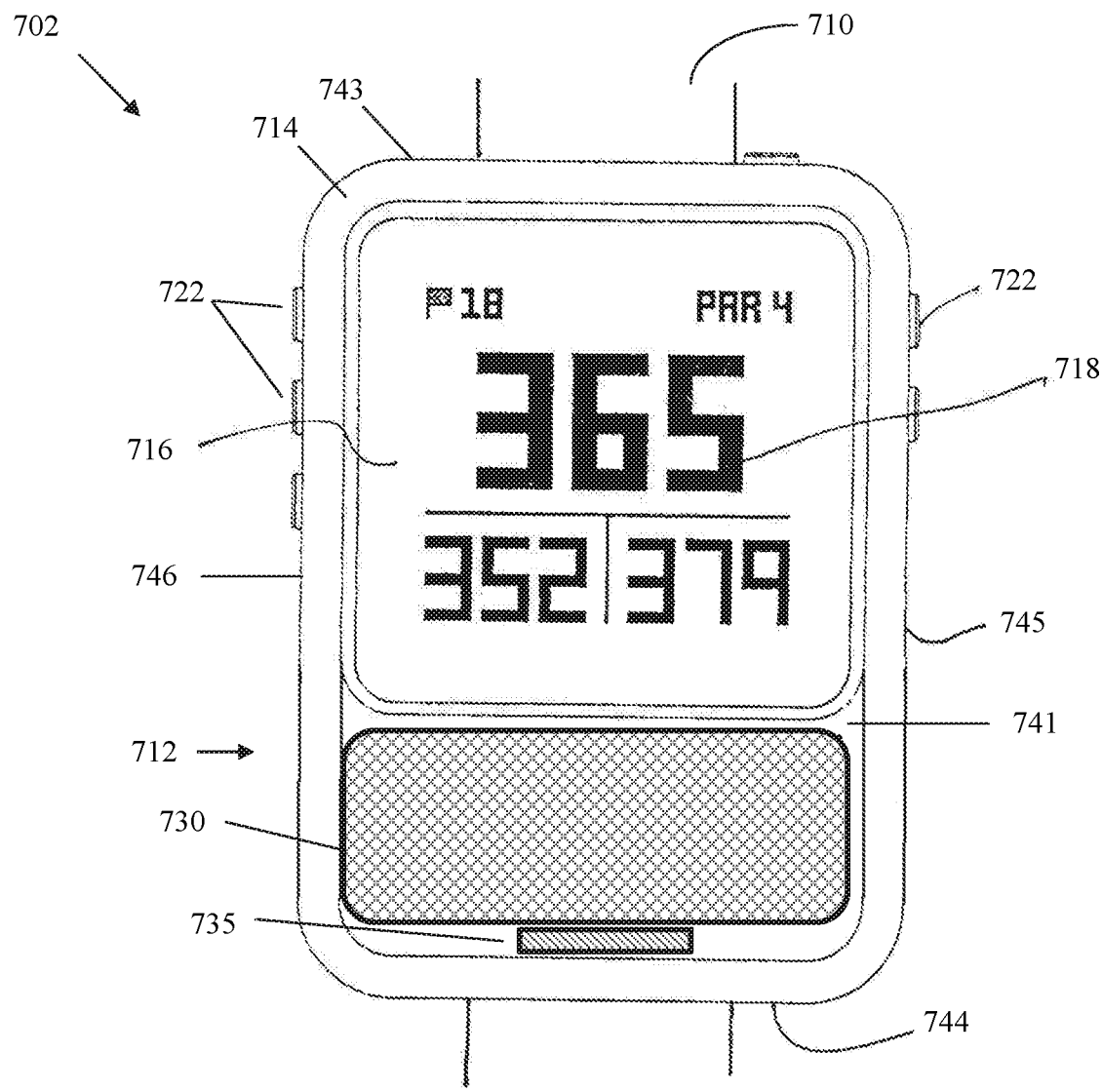
FIG. 7C is a front elevational view of the audio system including a visual display attached to the golf cart post of FIG. 7A with the display providing information according to an aspect of the present disclosure.
Figure 8:
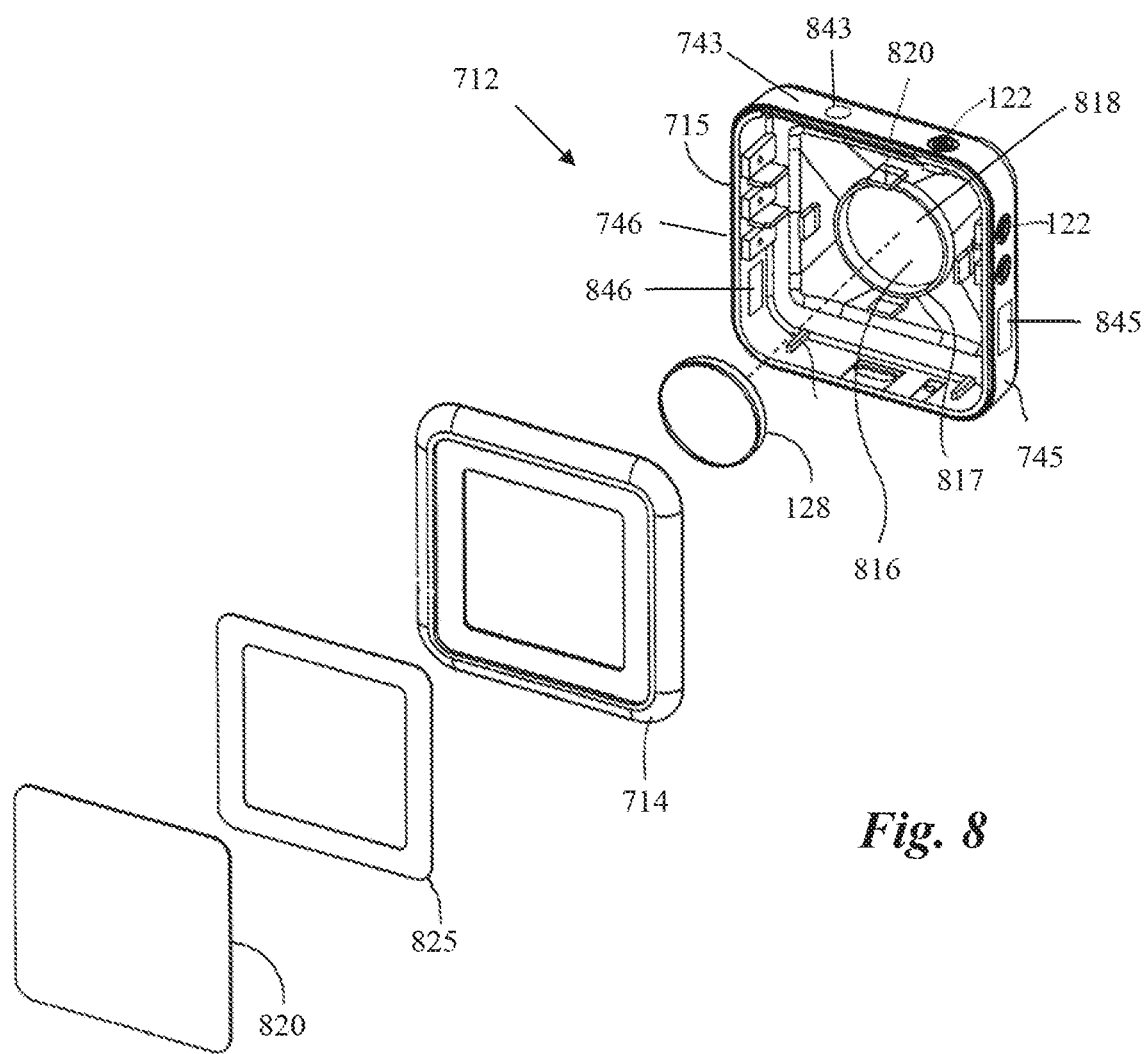
FIG. 8 shows an exploded view of the housing of the audio system including a visual display according to an aspect of the present disclosure.
Figure 9:
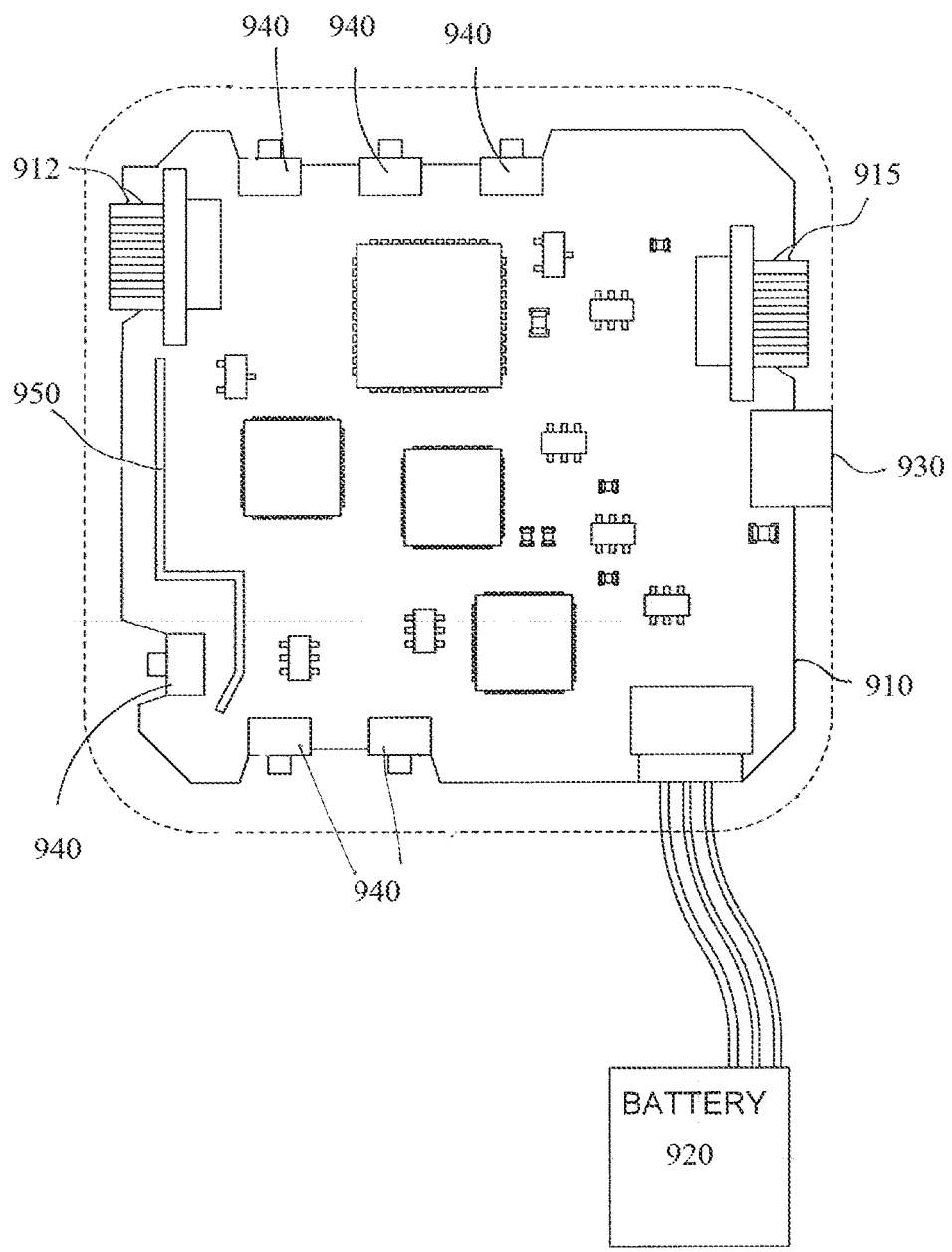
FIG. 9 and FIG. 10 show illustrations of printed circuit boards of audio systems including a visual display according to an aspect of the present disclosure.

FIGS. 7, 8, 9 show aspects of an audio visual device 702 according to an aspect of the present disclosure. The embodiments shown in these figures are for illustration and not limitation.

The display screen is positioned to be viewable at the front face of the device 702 where the device has a housing 712, where a portion of the housing 712 is utilized to provide an interface for a magnet 128, the portion of the housing having an exterior surface with no recesses and no concavities. The portion of the housing may be the entire rearward face of the device with a display screen on the forward face. Such an arrangement provides an elegantly simple design that keeps manufacturing costs low with the simple design, for example a simple clam shell configuration.

FIG. 7A is a perspective view showing the audio system including a visual display attached to an upright steel support member of the golf cart according to an aspect of the present disclosure.

FIG. 7B is a side view of the audio system including a visual display attached to a metal plate with a rear concavity of the rangefinder illustrating the standoff of the device from the surface of the metal plate according to an aspect of the present disclosure.

FIG. 7C is a front elevational view of the audio system including a visual display attached to the golf cart post of FIG. 7A with the display providing information according to an aspect of the present disclosure.

Referring to FIGS. 7A, 7B and 7C, the audiovisual device 702 with a magnetic attraction region 128 of the device housing 712 is attached to ferrous metal members, such as a steel post 710. Exteriorly, the audiovisual device 702 has the housing 712 with a bezel 714 surrounding a display screen 716. The display screen for display information 718 such as yards to the front, center and rear of a green, the current hole, and the par stroke number of the hole. Other displays may include a map of the course, a map of the current hole or other information. If the display is a touchscreen, icons for apps or control functions may be displayed for user input. A speaker 730 is also disposed on the front face of device 702. Additionally, operational controls configured as pushbuttons 722 extend out of sidewall portions of the device 702. Operational controls may include for example, a power button, play/pause button, up volume button, down volume button. Without limitation, operational controls may also be configured as dials, sliders or other control mechanisms (not shown). The device may also include a microphone 735 for audio (voice) input.

Still referring to FIGS. 7A-7C, in embodiments, generally the audio visual device 702 has a front face 741, a rearward face 742, a top face 743, a bottom face 744, and two lateral side faces 745, 746. The housing 712 has a forward or bezel portion 714 and a rearward portion 715 that meet at a juncture 717. The rearward portion has a projection or convexity 750 with a convexity surface 751. The convexity is centrally positioned with respect to the device. The projection or convexity 750 may extend to edge portions 752 of the rearward side around an entire reward side periphery 753. The rearward edge portions 752 and forward edge portions 754 have surfaces that are rounded with a radius of, for example, about 0.12 inches or greater. The edge portions for the purpose of dimensional aspects are where the corner radius ends on the surface of the edge portions.

In embodiments, the convexity may have planar portions with planar surfaces at each of the four sides of the convexity, with the planar surface portions joined by smooth rounded corner surface portions. At the most distal portion of the convexity is a plateau surface portion 751 with an outwardly facing planar surface wherein a magnet 128 is located to provide a magnetic attachment point to temporarily attach the device to a ferrous surface such as a support structure on a golf cart. In embodiments, the magnet may be used to attach an accessory such as a clip for attaching the device 702 to a golf bag, cart or apparel such as a belt. From the most distal portion, the convexity diverges to the margins of the rearward face. The convexity may be generally in the shape of a four sided truncated pyramid with rounded corners, the truncation presenting the planar surface 751. In other embodiments the convexity could be frusto-conical, or a truncated dome shaped. Indicia associated with the push buttons 722 may be provided on the rear convexity surface 751 or side faces 745, 746. The convexity may be subtle, for example extending a distance 166 of 0.25 inches or less rearwardly from the rearward edge portions.

In embodiments wherein the beacon is instantiated as an earpiece (e.g. earbuds) the convexity may also include a recess or compartment (not shown) for storage and charging of the earpiece when not in use.

In the embodiment shown in FIGS. 7A-7C, the device 702 has the speaker 730 and microphone 735 disposed on the front face 741. In other embodiments, the speaker 730 and microphone 735 may be disposed on other faces such as top face 743 and/or lateral side faces 745, 746. Advantageously, such configurations may provide for a larger visual display 716 on the front face 741. Speakers disposed on the lateral side faces 745, 746 may provide stereo play of the audio content.

Referring to FIG. 8, details of the housing 712 are illustrated. The forward and rearward housing portions 714, 715 have a respective forward wall portion 814 and rearward wall portion 815 as depicted and define an open interior 820. The rearward wall portion 715 has a recess 816 defined by an annular boss 817 that receives a magnet 128. The rearward housing portion may have a thinned wall region 818 at the magnet, and the magnet may be adhered to the thinned wall region in the recess with a suitable adhesive. A transparent screen cover 820 is adhered to the forward housing portion 714 by a suitable adhesive such as two sided tape 825. Control buttons 122 are disposed in top face 743 and side faces In the embodiment shown in FIG. 8, the display screen occupies a major portion of the front face 741. Ports 845 and 846 for speaker output are disposed in side faces 745 and 746 respectively. A port 843 for a microphone is disposed in top face 743.

The circuitry, including optionally a GPS receiver, a processor, memory, connecting to a battery, are all positioned in the interior of the housing, and the circuitry is further connected to a display screen positioned to be viewable within the bezel and user controls on the housing, speaker(s) and a microphone.

Referring to FIG. 9, the arrangement of components in the open interior 820 of the housing 712 is illustrated. A printed circuit board 910 has the display screen (not shown) attached thereto by a ribbon connector 912. A second ribbon connector 915 attaches speaker(s) to the circuit board 910.

The circuit board is connected to a battery 920. The circuit board may have a USB port 930. Micro-switches 950 are positioned on the board to align with push buttons 122 in the housing. The circuit board 910, battery 920, display screen and speakers are sandwiched between the forward and rearward housing portions 714, 715 and may be positioned by structure 960 molded into the housing portions. A cushion may be placed between the battery and circuit board.

In embodiments, the device 102 or 702, when attached to a metal surface such as a portion of a golf cart, requires a force exceeding 2 pounds to separate the device in a direction normal to the device display. In embodiments, the device when attached to the accessory, with the accessory fixed in place, will magnetically decouple with a lateral shear force of greater than three pounds, but less than about six pounds. In embodiments, the device when attached to a surface, with the accessory fixed in place, requires a lateral shear force of greater than 2 pounds to decouple the magnetic coupling and separate the device in a direction parallel to the device display surface, that is, parallel to the greatest dimension of the device. The amount of force required to detach the device from a metal surface can facilitate easy separation when the device is attached to something, with minimal effort.

In embodiments, a lateral shear force of 1 pound or less will not decouple the magnetic coupling and separate the device from the metal surface to prevent its detachment from the surface, such as for example when the golf cart is driven around the golf course.

A feature and advantage of embodiments is the combination of optimal size for handling and reading the display, while still being easily wearable, and while still being light-weight. The inventors have recognized that the light weight allows the use of a high integrity magnetic securement using the GPS rangefinder device magnet for attaching directly to a metal post or component of a golf cart as well as to an accessory clip that is then attached to a golf bag or user's apparel. For example, due to the light weight, for example less that about 3 ounces, bumps are less likely to disengage the magnet from the metal post or accessory clip as compared to a device with a greater weight. Additionally size and weight are optimal for easy pocketing and removal.

In embodiments, the device 702 has a greatest height or width dimension of less than 6 inches. In embodiments, the device has a rectangular appearance with rounded corners when viewing the display. In embodiments, the display side of the device 702 may have a width of less than 2.6 inches and a height of less than 6 inches. In embodiments, the display side of the device 702, as defined by its housing, may have a width of less than 2.3 inches and a height of less than 5 inches. In embodiments, the device 702, as defined by its housing, has a maximum depth of 0.95 inches. In embodiments, the device 702, as defined by its housing, has a maximum depth of 0.80 inches. In embodiments, a feature and advantage is that each exterior corner of the housing of the device is rounded and has a radius of 0.12 inches or greater. In embodiments, a feature and advantage is that each exterior corner of the housing of the device is rounded with has a radius of 0.10 inches or greater.

A feature and advantage of embodiments is that the audio-visual device has a planar front face where the display screen is located and a subtly projecting rear face such that a user when grasping the device, without looking at the device, can ascertain which side is the forward side and which side is the rearward side, minimizing the manipulation to raise the device to a use and viewing position. A feature and advantage is that each of four side wall are inclined inwardly from the front side to the rear side allowing a larger front side where the display is positioned compared to the rearward side that centrally magnetically attaches to a ferrous surface. Such a configuration accommodates the internal arrangement of components, for example the circuit board with display screen attached thereto is positioned forwardly at the front wall portion and has the largest area to be accommodated, the speaker(s), having the second greatest area to be accommodated, are positioned forwardly at the front wall portion and, or positioned behind the display screen, the battery, positioned next has the third greatest area to be accommodated, and the magnet at the rearward wall portion has the least amount of area to be accommodated. Thus, an optimal miniaturization has a housing with a front to rearward taper.

Figure 10:
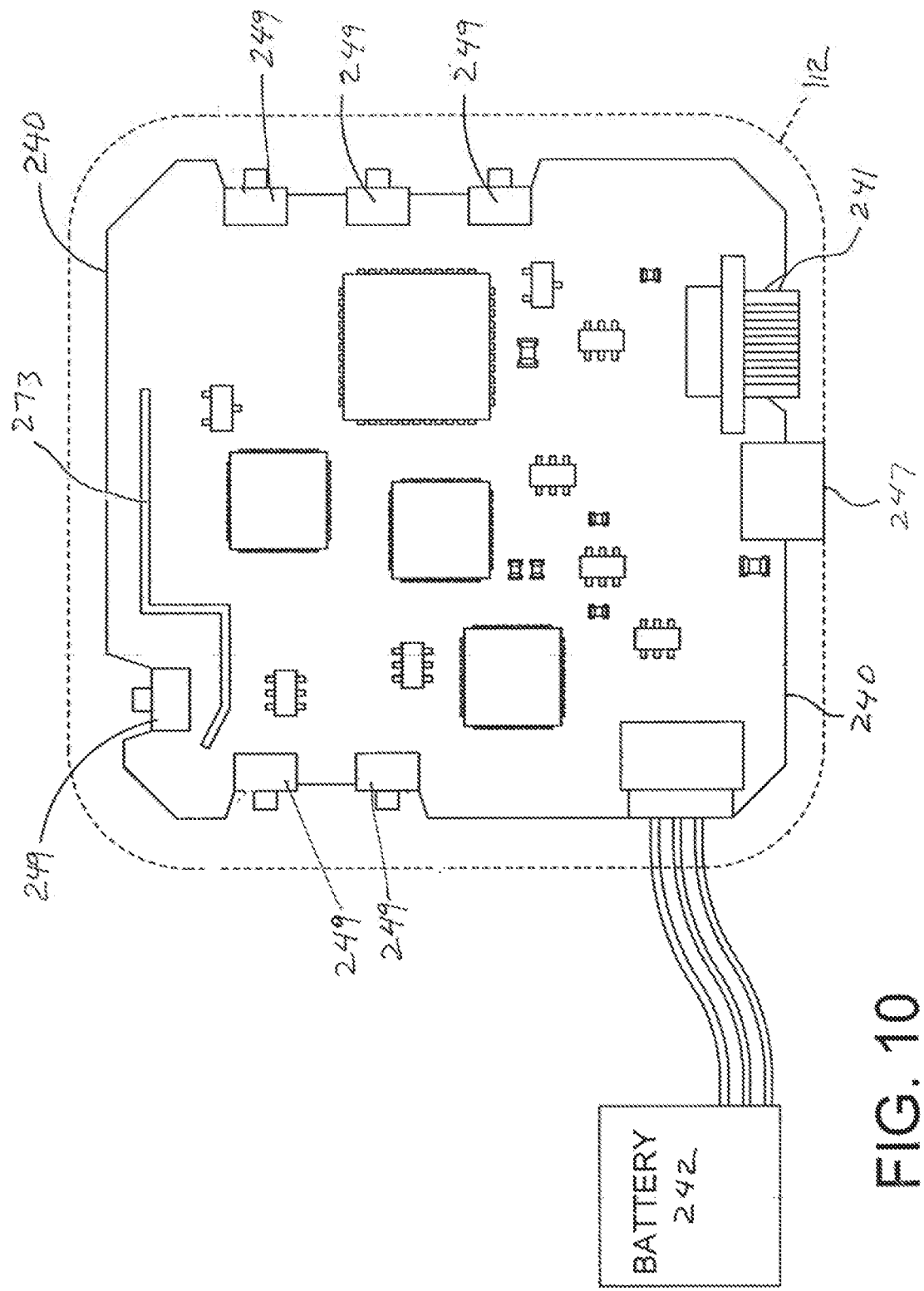

Referring to FIGS. 8, 9 and 10, the arrangement of components in the open interior 175 of the housing 112 is illustrated. A printed circuit board 240 has the display screen 116 attached thereto by a ribbon connector 241. The speaker (not shown) is also attached to the circuit board by a second ribbon connector (not shown). The circuit board is connected to a battery 360. The circuit board may have a USB port 370. Micro-switches 249 are positioned on the board to align with push buttons in the housing. The circuit board 240 and battery 360 are sandwiched between the forward and rearward housing portions 142, 144 and may be positioned by structure 253 molded into the housing portions. A cushion 246 may be placed between the battery and circuit board.

While aspects of the present disclosure may provide functionalities and capabilities located on a remote device, one skilled in the art will recognize that those functionalities may be located, processed or otherwise carried out in the audio system itself or on another device coupled to the audio system without deviating from the scope of the disclosure.

While aspects of the present disclosure provide for an audio system to be used on a golf course by a golfer, one skilled in the art will recognize that the use and applicability of the audio system as described herein is not so limited and may be used in other environments.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An audio system comprising:
   a speaker device;
   a beacon configured to trigger a request for shot location, wherein the beacon comprises an earpiece, a sensor, and a GPS-enabled location service;
   a controller wirelessly coupled to the beacon; and
   a non-transitory, computer-readable storage medium in operable communication with the controller, wherein the computer-readable storage medium contains one or more programming instructions that, when executed, cause the controller to:
   determine the operational state of the earpiece, based at least in part on sensor information and user input;
   if the earpiece is in an active state based on sensor information, receive a request for shot information triggered from the wireless beacon;
   transmit the request to a processor;
   receive shot information from the processor;
   encode the shot information as an audio file; and
   if the earpiece is in an inactive state, wirelessly transmit the audio file to the speaker device for audio playback;
   if the earpiece is in an active state and a user-selected public state, wirelessly transmit the audio file to the speaker device for audio playback;
   if the earpiece is in an active state and a user-selected private state, wirelessly transmit the audio file to an audio output on the earpiece for audio playback; and
   if the earpiece is in an active state and a user-selected silent state, blocking transmission of the audio file.

2. The audio system of claim 1, wherein the earpiece comprises an earbud or a pair of earbuds.

3. The audio system of claim 1, further comprising a microphone coupled to the controller, the microphone configured to receive a voice command.

4. The audio system of claim 3 wherein the beacon is configured to activate the microphone.

5. The audio system of claim 1, wherein the beacon further comprises an actuator, the actuator configured to trigger the request for the shot information.

6. The audio system of claim 1, wherein the beacon is coupled to the controller through a Bluetooth connection.

7. The audio system of claim 1, wherein the shot information comprises a geographic location correlated with environmental information.

8. The audio system of claim 7 wherein the environmental information includes data relating to at least one landmark.

9. The audio system of claim 8 wherein the shot information includes a distance between the beacon and the at least one landmark.

10. The audio system of claim 1, wherein the shot information includes at least one of a distance, an environmental element, a geographic location element, a shot history, a commentary, and an applause element.

11. The audio system of claim 1, wherein the controller includes an application stored on a mobile device.

12. The audio system of claim 1, wherein the user input comprises a tap signal, voice command, or a combination thereof.

13. The audio system of claim 1, wherein the speaker device defines a recess, the recess sized and shaped to retain the earpiece.

14. The audio system of claim 1, wherein the speaker device further comprises a charging interface configured to charge the beacon.

15. The audio system of claim 1, wherein the speaker device further comprises a magnetic mount configured to mount the speaker device directly on a magnetic surface.

16. The audio system of claim 1, wherein the speaker device further comprises a visual display.

17. A method of determining shot information comprising:
   providing a controller and a non-transitory, computer-readable storage medium in operable communication with the controller;
   providing a wireless beacon comprising an earpiece, a sensor and a GPS-enabled location service;
   determining by the controller, the operational state of the earpiece, based at least in part on sensor information and user input;
   if the earpiece is in an active state based on sensor information, receiving a request for shot information from the wireless beacon;
   transmitting the request to a processor;
   receiving shot information from the processor;
   encoding the shot information as an audio file;
   if the earpiece is in an inactive state, wirelessly transmitting the audio file to a speaker device for audio playback;
   if the earpiece is in an active state and a user-selected public state, wirelessly transmitting the audio file to the speaker device for audio playback;
   if the earpiece is in an active state and a user-selected private state, wirelessly transmitting the audio file to an audio output on the earpiece and
   if the earpiece is in an active state and a user-selected silent state, blocking transmission of the audio file.

* * * * *